(12) United States Patent
Watanabe

(10) Patent No.: US 11,183,892 B2
(45) Date of Patent: Nov. 23, 2021

(54) CONSEQUENT POLE TYPE ROTOR, MOTOR HAVING THE SAME, COMPRESSOR HAVING THE SAME, AND FAN HAVING THE SAME

(71) Applicant: Mitsubishi Electric Corporation, Tokyo (JP)

(72) Inventor: Takanori Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 16/482,426

(22) PCT Filed: Mar. 3, 2017

(86) PCT No.: PCT/JP2017/008441
§ 371 (c)(1),
(2) Date: Jul. 31, 2019

(87) PCT Pub. No.: WO2018/158930
PCT Pub. Date: Sep. 7, 2018

(65) Prior Publication Data
US 2020/0251944 A1 Aug. 6, 2020

(51) Int. Cl.
*H02K 1/27* (2006.01)
*F24F 1/022* (2019.01)
(Continued)

(52) U.S. Cl.
CPC .......... *H02K 1/2766* (2013.01); *F24F 1/022* (2013.01); *F25B 31/026* (2013.01); *H02K 7/14* (2013.01); *H02K 21/16* (2013.01)

(58) Field of Classification Search
CPC ........ H02K 1/2766; H02K 1/276; H02K 1/28; H02K 1/2746; H02K 1/30; H02K 7/14;
(Continued)

(56) References Cited

U.S. PATENT DOCUMENTS

| 2008/0224558 A1* | 9/2008 | Ionel | H02K 1/2766 |
| | | | 310/156.57 |
| 2011/0309707 A1* | 12/2011 | Kato | H02K 1/146 |
| | | | 310/156.54 |

(Continued)

FOREIGN PATENT DOCUMENTS

| CN | 203135606 U | 8/2013 |
| CN | 106341019 A | 1/2017 |

(Continued)

OTHER PUBLICATIONS

International Search Report of the International Searching Authority dated May 30, 2017 for the corresponding International application No. PCT/JP2017/008441 (and English translation).

(Continued)

*Primary Examiner* — Michael Andrews
(74) *Attorney, Agent, or Firm* — Posz Law Group, PLC

(57) ABSTRACT

A rotor includes a rotation shaft, a rotor core, and a permanent magnet. The rotor core includes a shaft fixing part having a shaft insertion hole in which the rotation shaft is inserted, an annular magnet holding part surrounding the shaft fixing part from outside in a radial direction about a central axis of the rotation shaft and being distanced from the shaft fixing part, and a connecting part connecting the shaft fixing part and the magnet holding part to each other. The permanent magnet is mounted in the magnet holding part and forms a first magnetic pole. A portion of the magnet holding part adjacent to the permanent magnet in a circumferential direction forms a second magnetic pole. The connecting part has at least two ribs distanced from each other in the direction of the central axis.

20 Claims, 27 Drawing Sheets

(51) Int. Cl.
*F25B 31/02* (2006.01)
*H02K 7/14* (2006.01)
*H02K 21/16* (2006.01)

(58) Field of Classification Search
CPC ......... H02K 21/16; H02K 21/14; F24F 1/022; F25B 1/026
USPC .............................. 310/156.53, 43, 216.016
See application file for complete search history.

(56) References Cited

U.S. PATENT DOCUMENTS

| | | | |
|---|---|---|---|
| 2012/0169163 A1 | 7/2012 | Imai et al. | |
| 2014/0042834 A1* | 2/2014 | Asahi | H02K 15/03 310/43 |
| 2014/0184009 A1* | 7/2014 | Taniguchi | H02K 1/2746 310/156.53 |
| 2017/0012503 A1* | 1/2017 | Okochi | H02K 1/32 |
| 2019/0173337 A1* | 6/2019 | Shimokawa | H02K 1/27 |
| 2019/0288588 A1* | 9/2019 | Sato | H02K 17/16 |

FOREIGN PATENT DOCUMENTS

| | | |
|---|---|---|
| JP | 2012-005252 A | 1/2012 |
| JP | 2014-131376 A | 7/2014 |
| JP | 5570884 B2 | 8/2014 |
| JP | 5684529 B2 | 3/2015 |
| JP | 5700643 B2 | 4/2015 |
| JP | 5755896 B2 | 7/2015 |

OTHER PUBLICATIONS

Office Action dated Aug. 31, 2020 issued in corresponding CN patent application No. 201780085460.0 (and English translation).
Chinese Office Action dated Mar. 22, 2021, issued in corresponding CN Patent Application No. 201780085460.0 (and English Machine Translation).
Chinese Office Action dated Aug. 16, 2021, issued in corresponding CN Patent Application No. 201780085460.0 (and English Machine Translation).

* cited by examiner

US 11,183,892 B2

CONSEQUENT POLE TYPE ROTOR, MOTOR HAVING THE SAME, COMPRESSOR HAVING THE SAME, AND FAN HAVING THE SAME

CROSS REFERENCE TO RELATED APPLICATION

This application is a U.S. national stage application of International Patent Application No. PCT/JP2017/008441 filed on Mar. 3, 2017, the disclosure of which is incorporated herein by reference.

TECHNICAL FIELD

The present invention relates to a rotor, a motor having the rotor, and a compressor and a fan having the motor.

BACKGROUND

Conventionally, a motor having permanent magnets mounted on a rotor is widely used. In recent years, in order to reduce the number of permanent magnets, there has been developed a consequent-pole motor including a rotor having magnet magnetic poles and pseudo-magnetic poles alternately arranged in a circumferential direction. The magnet magnetic poles are formed by the permanent magnets, while the pseudo-magnetic poles are each formed by a portion of a rotor core between adjacent permanent magnets (see, for example, Patent References 1 to 4).

PATENT REFERENCE

Patent Reference 1: Japanese Patent Publication No. 5700643 (see FIG. 19)
Patent Reference 2: Japanese Patent Publication No. 5570884 (see FIG. 6)
Patent Reference 3: Japanese Patent Publication No. 5755896 (see FIG. 2)
Patent Reference 4: Japanese Patent Publication No. 5684529 (see FIG. 2)

In the consequent-pole motor, since the pseudo-magnetic poles of the rotor have no permanent magnet, magnetic flux flows into a rotation shaft, and thus magnetic flux leakage occurs. This leads to reduction in output of the motor.

SUMMARY

The present invention is intended to solve the above described problem, and an object of the present invention is to provide a rotor capable of reducing magnetic flux leakage to a rotation shaft and suppressing reduction in output of a motor.

A rotor according to the present invention includes a rotation shaft, a rotor core having a shaft fixing part having a shaft insertion hole in which the rotation shaft is inserted, an annular magnet holding part surrounding the shaft fixing part from outside in a radial direction about a central axis of the rotation shaft and being distanced from the shaft fixing part, and a connecting part connecting the shaft fixing part and the magnet holding part to each other, and a permanent magnet mounted in the magnet holding part and forming a first magnetic pole. A portion of the magnet holding part adjacent to the permanent magnet in a circumferential direction forms a second magnetic pole. The connecting part has at least two ribs distanced from each other in a direction of the central axis.

According to the present invention, since the shaft fixing part and the magnet holding part are connected to each other via the connecting part, and the connecting part includes at least two ribs distanced from each other in an axial direction (the direction of the central axis of the rotation shaft), flow of magnetic flux between the magnet holding part and the shaft fixing part can be restricted, so that magnetic flux leakage to the rotation shaft can be suppressed. Thus, reduction in output of the motor can suppressed.

DETAILED DESCRIPTION

First, a general motor and a consequent-pole motor, which are premises of embodiments of the present invention will be described.

(General Motor)

Figure 1A:
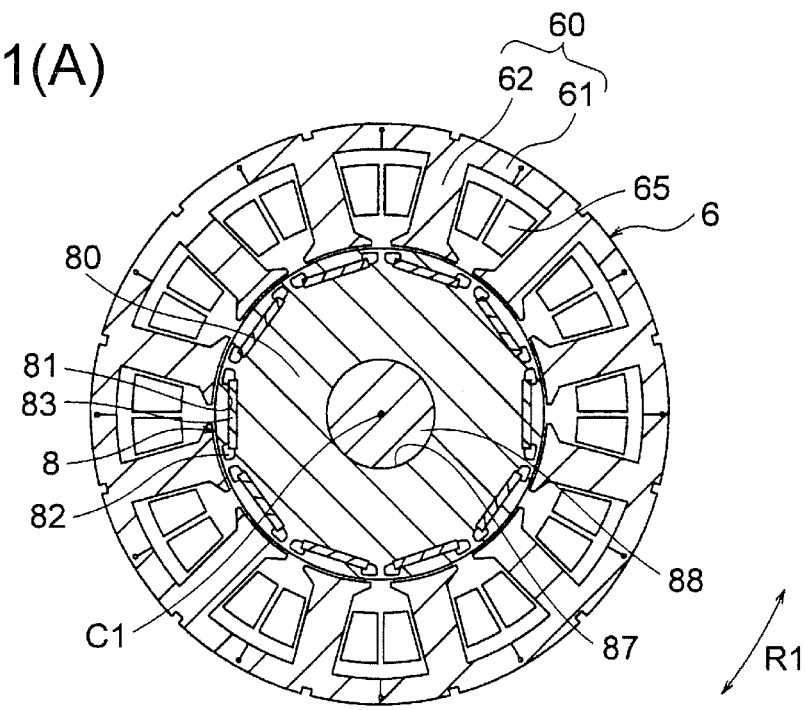
FIG. 1(A) and FIG. 1(B) are cross-sectional views illustrating a general motor and a rotor of the general motor.

FIG. 1(A) is a cross-sectional view illustrating a general motor. In this regard, a "cross-sectional view" is a sectional view taken along a plane perpendicular to a central axis of a rotation shaft of a rotor, and a "longitudinal sectional view" is a sectional view taken along a plane parallel to the central axis (a plane including the central axis).

The motor illustrated in FIG. 1(A) includes a rotor 8, and an annular stator 6 provided to surround the rotor 8. An air gap is formed between the rotor 8 and the stator 6. An axis (central axis) serving as a center of rotation of the rotor 8 is defined as an axis C1.

The stator 6 includes a stator core 60, and coils 65 wound around the stator core 60. The stator core 60 includes a yoke part 61 having an annular shape about the axis C1, and a plurality of (in this example, twelve) teeth 62 extending from the yoke part 61 toward the axis C1. Ends of the teeth 62 face an outer circumferential surface of the rotor 8. Slots are formed each between adjacent ones of the teeth 62. The coils 65 are wound around the teeth 62 in, for example, concentrated winding.

Figure 1B:
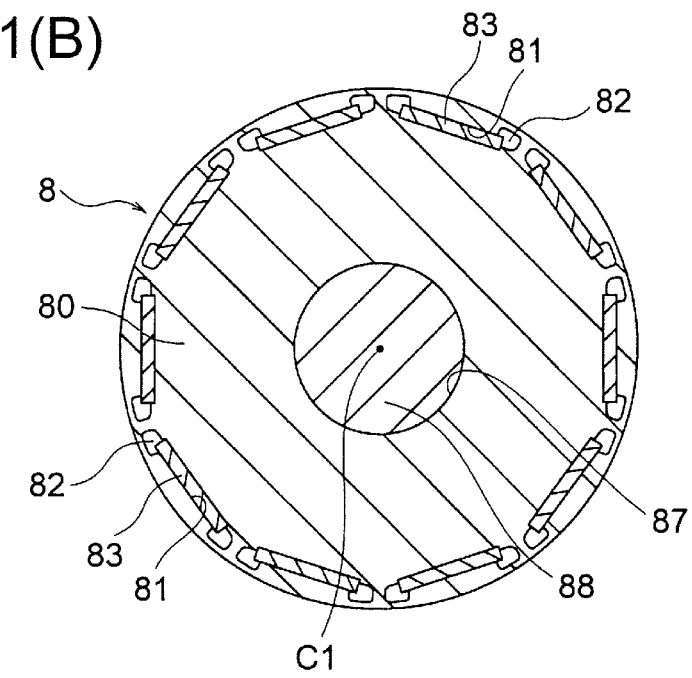

FIG. 1(B) is a cross-sectional view illustrating the rotor 8. The rotor 8 includes a rotor core 80, and a rotation shaft 88 fixed to the rotor core 80, as illustrated in FIG. 1(B). A shaft insertion hole 87 in which the rotation shaft 88 is inserted is formed at a center of the rotor core 80 in the radial direction. A central axis of the rotation shaft 88 corresponds to the above described axis C1.

A plurality of (in this example, ten) magnet insertion holes 81 are arranged along an outer circumference of the rotor core 80. The magnet insertion holes 81 are arranged at even intervals in the circumferential direction. A permanent magnet 83 is disposed in each of the magnet insertion holes 81. Flux barriers (leakage magnetic flux suppression holes) 82 for suppressing leakage magnetic flux are formed on both sides of each magnet insertion hole 81 in the circumferential direction.

The permanent magnets 83 may be formed of, for example, ferrite sintered magnets, ferrite bonded magnets, or Sm (samarium)-Fe (iron)-B (boron) bonded magnets. In a motor used in a compressor or a fan of an air conditioning apparatus, the permanent magnets 83 are often formed of neodymium sintered magnets containing Nd (neodymium)-Fe—B as main components and having a stronger magnetic force, in terms of improving efficiency.

However, the neodymium sintered magnet contains Nd as a rare-earth element. A rare-earth element such as Dy (dysprosium) or Tb (terbium) is also added to the neodymium sintered magnet to improve coercive force. Nd, Dy, and Tb are all expensive, and thus use of these elements leads to an increase in material cost.

The permanent magnets 83 are generally machined by cutting a block-like mass, and therefore material yield decreases as a thickness and a size of each permanent magnet 83 decrease. Accordingly, manufacturing cost increases as the number of permanent magnets 83 used for one motor increases. Thus, in order to reduce the manufacturing cost of the motor, it is desirable to reduce the number of permanent magnets 83 within a range in which a sufficient amount of magnetic flux for driving the motor can be obtained.

In this case, if the number of permanent magnets 83 can be reduced, a volume of each permanent magnet 83 can be increased without increasing a total use amount of permanent magnet material. This is because machining cost is reduced by increasing a volume of the permanent magnet 83.

Therefore, in order to reduce the number of permanent magnets to thereby reduce the manufacturing cost, the following consequent-pole motor is developed.

(Consequent-pole Motor)

Figure 2A:
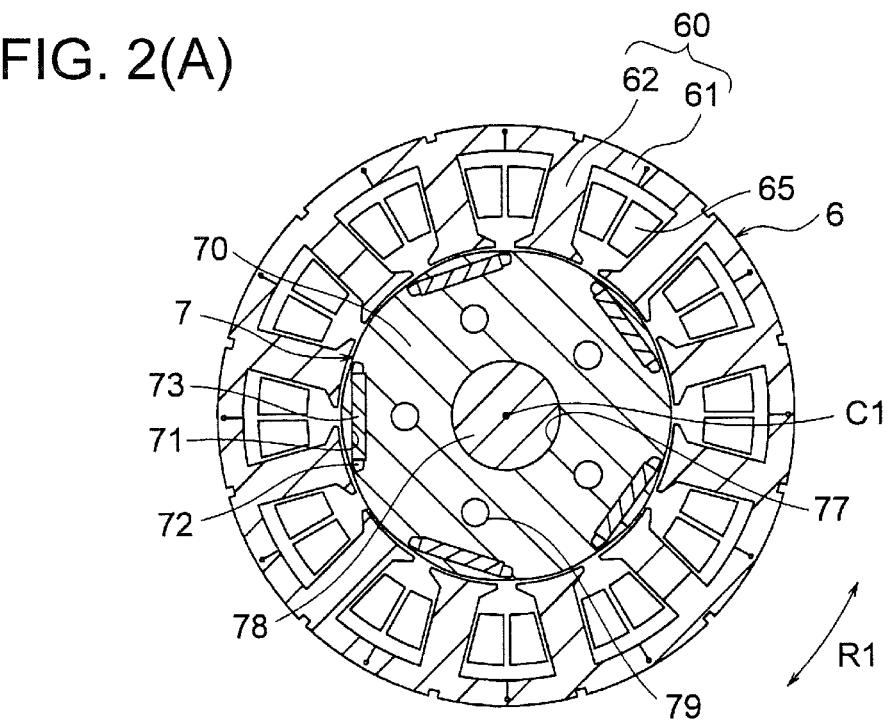
FIG. 2(A) and FIG. 2(B) are cross-sectional views illustrating a consequent-pole motor (A) and a rotor (B) of the consequent-pole motor.

FIG. 2(A) is a cross-sectional view illustrating a consequent-pole motor. The motor illustrated in FIG. 2(A) includes a rotor 7, and a stator 6 surrounding the rotor 7. An air gap is formed between the rotor 7 and the stator 6. An axis serving as a center of rotation of the rotor 7 is defined as an axis C1. A configuration of the stator 6 is the same as that of the stator 6 of the motor illustrated in FIG. 1(A).

Figure 2B:
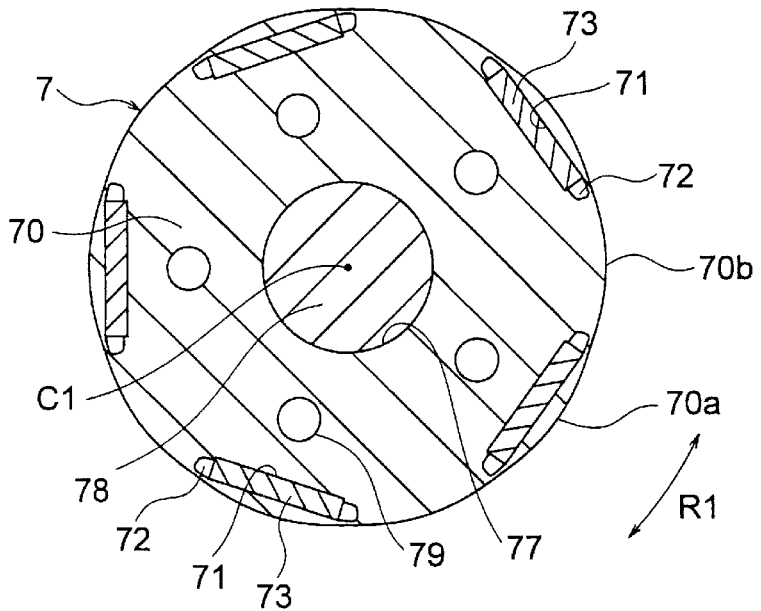

FIG. 2(B) is a cross-sectional view illustrating the rotor 7. The rotor 7 includes a rotor core 70, and a rotation shaft 78 fixed to the rotor core 70, as illustrated in FIG. 2(B). A shaft insertion hole 77 in which the rotation shaft 78 is inserted is formed at a center of the rotor core 70 in the radial direction. A central axis of the rotation shaft 78 corresponds to the above described axis C1.

A plurality of (in this example, five) magnet insertion holes 71 are arranged along an outer circumference of the rotor core 70. The magnet insertion holes 71 are arranged at even intervals in the circumferential direction. Flux barriers (leakage magnetic flux suppression holes) 72 for suppressing leakage magnetic flux are formed on both sides of each magnet insertion hole 71 in the circumferential direction.

A permanent magnet 73 is disposed in each of the magnet insertion holes 71. The permanent magnets 73 are disposed so that the same magnetic pole surfaces (for example, north poles) face an outer peripheral side. Therefore, a portion where magnetic flux flows in the radial direction is formed between each pair of adjacent permanent magnets 73 in the rotor core 70. This portion serves as a pseudo-magnetic pole 70b.

More specifically, in the rotor 7 of the consequent-pole motor, magnet magnetic poles 70a (first magnetic poles)

formed by the permanent magnets 73, and pseudo-magnetic poles 70b (second magnetic poles) formed by the rotor core 70 are alternately arranged in the circumferential direction.

Through holes 79 (openings) are formed on an outer side of the shaft insertion hole 77 in the radial direction. The through holes 79 serve to guide flow of magnetic flux toward the pseudo-magnetic poles 70b.

As above, since the consequent-pole rotor 7 has a configuration in which the magnet magnetic poles 70a and the pseudo-magnetic poles 70b are alternately arranged in the circumferential direction, the number of permanent magnets 73 in the rotor 7 is half the number of permanent magnets 73 in the general rotor 8 (FIG. 1(B)), and thus the manufacturing cost can be greatly reduced.

However, since the pseudo-magnetic poles 70b of the rotor 7 have no permanent magnets 72, the magnetic flux passing through the pseudo-magnetic poles 70b flows inward in the radial direction, and magnetic flux leakage to the rotation shaft 78 inserted in the shaft insertion hole 77 occurs. This leads to reduction in output of the motor.

In order to suppress the magnetic flux leakage to the rotation shaft 78, it is conceivable to increase a size of a rotor (increase a distance from the permanent magnet 73 to the rotation shaft 78). However, if the size of the rotor increases, a size of the motor also increases. This leads to increases in weight and manufacturing cost of the motor.

The embodiments of the present invention are intended to effectively suppress the leakage magnetic flux to the rotation shaft in the consequent-pole motor to thereby suppress reduction in output of the motor.

First Embodiment (Configuration of Motor)

Figure 3:
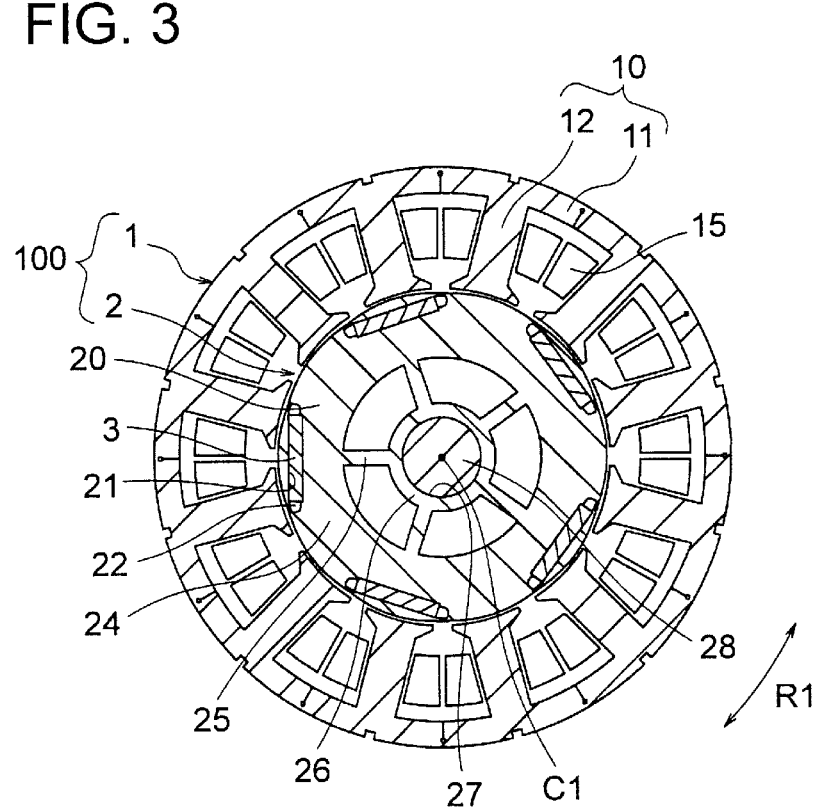
FIG. 3 is a cross-sectional view illustrating a motor in a first embodiment.
Figure 27:
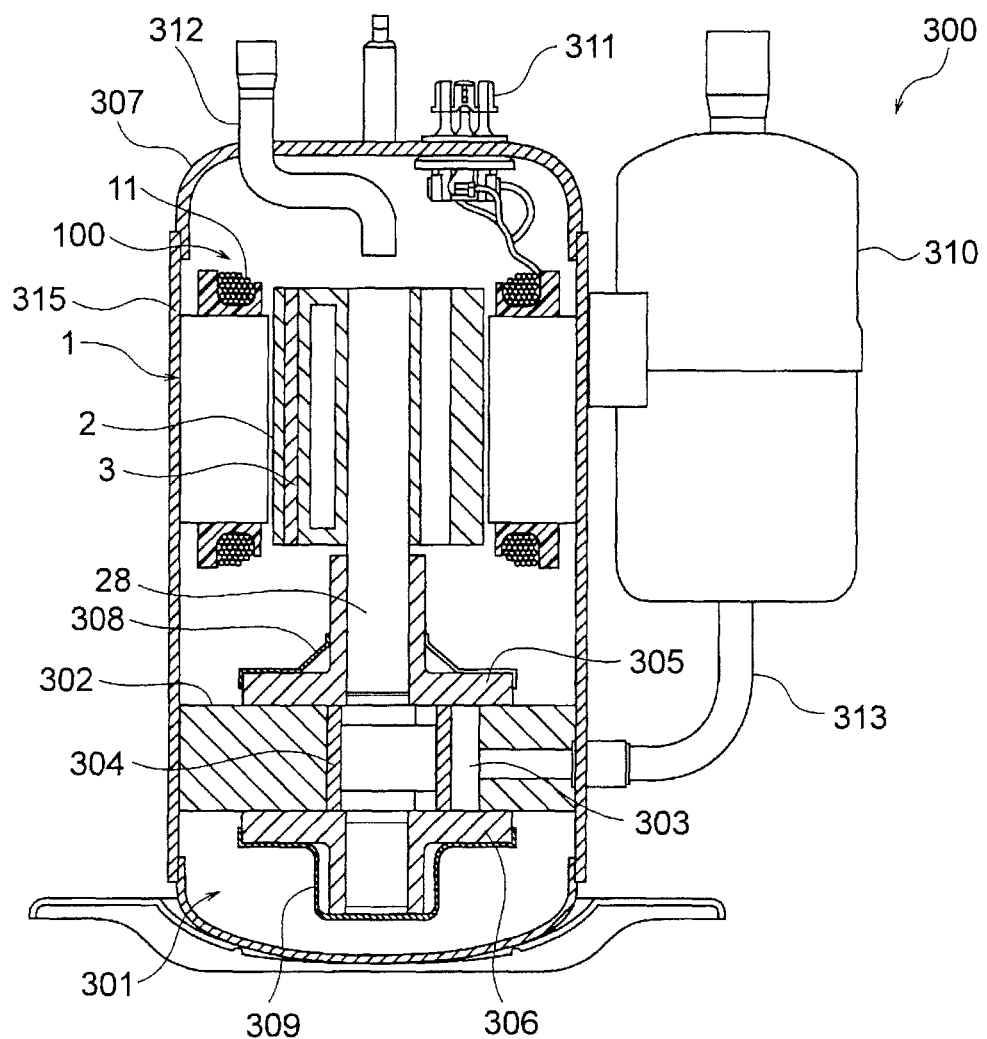
FIG. 27 is a longitudinal sectional view illustrating a compressor to which the motor in each of the embodiments is applicable.
Figure 28:
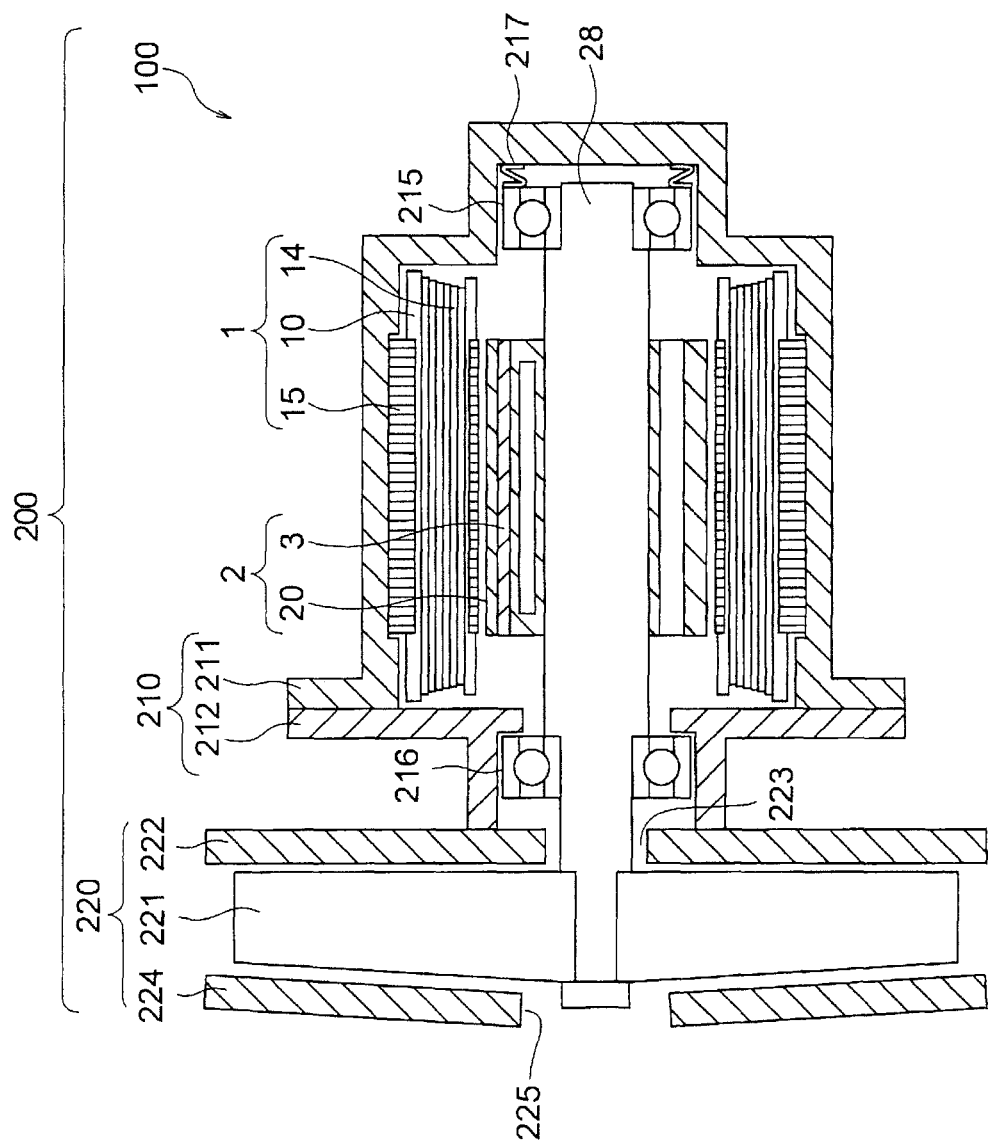
FIG. 28 is a longitudinal sectional view illustrating a fan to which the motor in each of the embodiments is applicable.

A motor 100 in the first embodiment of the present invention will be described. FIG. 3 is a cross-sectional view illustrating the motor 100 in the first embodiment. The motor 100 is, for example, a three-phase synchronous motor used in, for example, a rotary compressor 300 (FIG. 27) or a fan (FIG. 28). The motor 100 includes a rotor 2, and an annular stator 1 provided to surround the rotor 2. An air gap is formed between the rotor 2 and the stator 1. An axis serving as a center of rotation of the rotor 2 is defined as an axis C1.

Hereinafter, a direction of the axis C1 will simply be referred to as the "axial direction". A circumferential direction (indicated by an arrow R1 in FIG. 3) about the axis C1 will simply be referred to as the "circumferential direction". A radial direction of each of the stator 1 and the rotor 2 about the axis C1 will simply be referred to as the "radial direction".

As illustrated in FIG. 3, the stator 1 includes a stator core 10, and coils 15 wound around the stator core 10. The stator core 10 is formed by a stacked body of a plurality of electromagnetic steel sheets stacked in the axial direction.

The stator core 10 includes a yoke part 11 having an annular shape about the axis C1, and a plurality of teeth 12 extending from the yoke part 11 toward the axis C1. Ends of the teeth 12 face the outer circumferential surface of the rotor 2. Slots are formed each between adjacent ones of the teeth 12. The coils 15 are wound around the teeth 12 in, for example, concentrated winding. The number of teeth 12 (that is, the number of slots) is twelve in this example, but it is not limited to twelve.

Figure 4A:
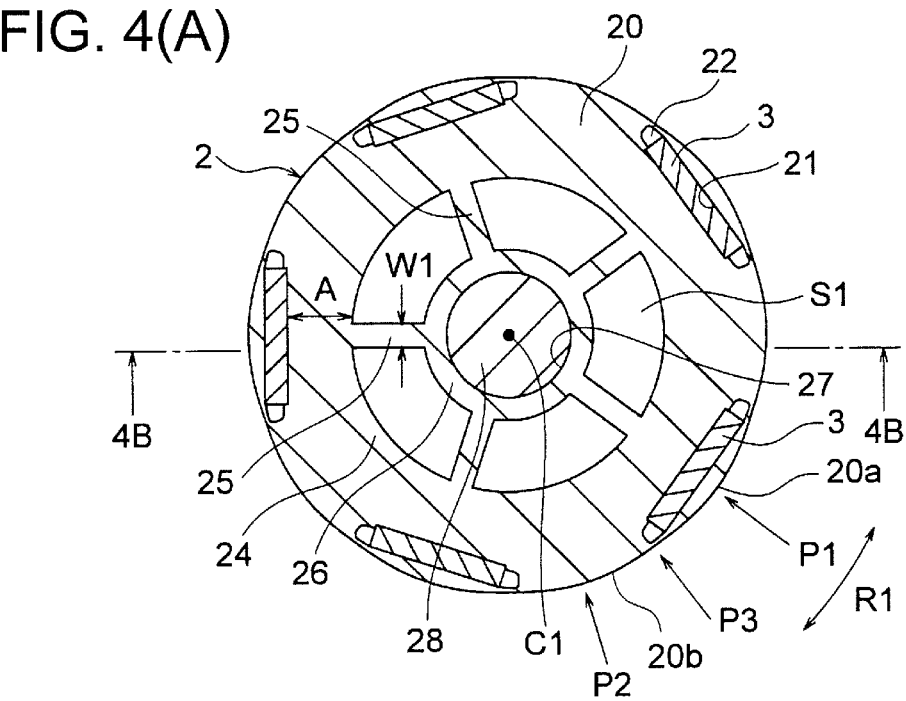
FIG. 4(A) and FIG. 4(B) are a cross-sectional view and a longitudinal sectional view illustrating a rotor of the motor in the first embodiment.
Figure 4B:
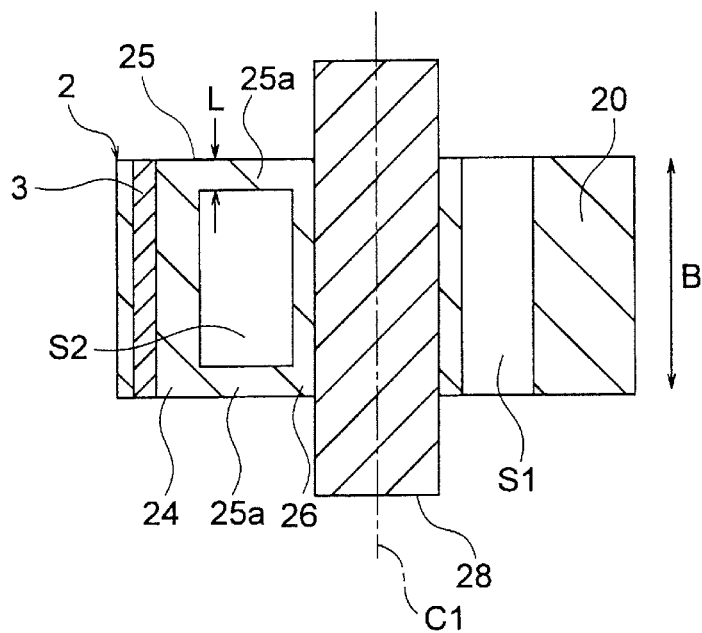

FIG. 4(A) is a cross-sectional view illustrating the rotor 2 of the motor 100. FIG. 4(B) is a sectional view (longitudinal sectional view) taken along a line 4B-4B illustrated in FIG. 4(A) as seen in a direction indicated by arrows. As illustrated in FIG. 4(A), the rotor 2 includes a rotor core 20, and a rotation shaft 28 fixed to the rotor core 20. A central axis of the rotation shaft 28 corresponds to above described axis C1.

The rotor core 20 is a member having an annular shape about the axis C1, and has a length B in the axial direction. The rotor core 20 is formed by a stacked body of a plurality of electromagnetic steel sheets stacked in the axial direction.

The rotor core 20 includes a shaft fixing part 26 fixed to the rotation shaft 28, an annular magnet holding part 24 surrounding the shaft fixing part 26 from an outer side in the radial direction, and connecting parts (beam parts) 25 connecting the shaft fixing part 26 and the magnet holding part 24 to each other.

The shaft fixing part 26 has a cylindrical shape about the axis C1. A shaft insertion hole 27 in which the rotation shaft 28 is inserted is formed at a center of the shaft fixing part 26 in the radial direction.

The magnet holding part 24 is disposed on an outer side of and at a distance from the shaft fixing part 26 in the radial direction, and extends in an annular shape about the axis C1. A length of the magnet holding part 24 in the axial direction is equal to a length of the shaft fixing part 26 in the axial direction (the above described length B).

The magnet holding part 24 includes a plurality of (in this example, five) magnet insertion holes 21 along its outer circumference. The magnet insertion holes 21 are arranged at even intervals in the circumferential direction. The magnet insertion holes 21 pass through the magnet holding part 24 in the axial direction. Each of the magnet insertion holes 21 has a width in the circumferential direction and a thickness in the radial direction. A distance from an inner circumference (that is, an inner end in the radial direction) of the magnet holding part 24 to the magnet insertion hole 21 is defined as a distance A.

A permanent magnet 3 is disposed in each magnet insertion hole 21 of the magnet holding part 24. Each of the permanent magnets 3 is a flat plate member having a length in the axial direction, a width in the circumferential direction, and a thickness in the radial direction. The permanent magnet 3 is formed of, for example, a neodymium sintered magnet containing Nd—Fe—B as main components. However, it is also possible to use a rare-earth magnet other than neodymium sintered magnet, or a permanent magnet other than the rare-earth magnet.

The permanent magnet 3 is disposed so that the same magnetic poles (for example, north poles) face an outer peripheral side of the magnet holding part 24. Therefore, a portion where magnetic flux flows in the radial direction is generated between each pair of adjacent permanent magnets 3 in the rotor core 20. The portion serves as a pseudo-magnetic pole 20b.

More specifically, in the magnet holding part 24, magnet magnetic poles 20a (first magnetic poles) formed by the permanent magnets 3, and pseudo-magnetic poles 20b (second magnetic poles) formed by the rotor core 20 are alternately arranged in the circumferential direction. Hence, the number of magnetic poles of the rotor 2 is ten. The number of permanent magnets 3 is half (five) the number of poles (ten poles).

The outer circumference of the magnet holding part 24 has a so-called flower circular shape. In other words, the outer circumference of the magnet holding part 24 has a shape such that its outer diameter is the maximum at pole centers P1 and P2 (centers of the magnetic poles 20a and 20b in the circumferential direction), and is the minimum at inter-pole parts P3 (between adjacent magnetic poles). A shape of the outer circumference of the magnet holding part 24 is not limited to the flower circular shape, and may be a circular shape.

In the magnet holding part 24, flux barriers (leakage magnetic flux suppression holes) 22 are formed on both sides of each magnet insertion hole 21 in the circumferential direction. The flux barriers 22 serve to suppress leakage magnetic flux between adjacent permanent magnets 3.

A plurality of connecting parts 25 are disposed between the magnet holding part 24 and the shaft fixing part 26. The plurality of connecting parts 25 radially extend from the shaft fixing part 26 to the magnet holding part 24. The plurality of connecting parts 25 are arranged at even intervals in the circumferential direction. Each connecting part 25 extends in the radial direction about the axis C1. Each connecting part 25 has a dimension (width) W1 in the circumferential direction.

The number of connecting parts 25 is equal (five) to the number of permanent magnets 3 in this example. Each connecting part 25 extends from the shaft fixing part 26 toward a central part of the corresponding permanent magnet 3 (magnet magnetic pole 20a) in the circumferential direction. In other words, each connecting part 25 is desirably distanced from the pseudo-magnetic poles 20b as much as possible in the circumferential direction.

As illustrated in FIG. 4(B), each connecting part 25 includes two ribs 25a at both ends in the axial direction, and an opening part S2 at a central part (that is, between the two ribs 25a) in the axial direction. The opening part S2 is, for example, a quadrangular opening part, but the opening part may have any shape. A dimension (thickness) of each rib 25a in the axial direction is defined as a dimension L.

A dimension W1 of each rib 25a in the circumferential direction (that is, a dimension of the connecting part 25 in the circumferential direction) is desirably equal to or less than ½ of the distance A (W1≤A/2) from the inner circumference of the magnet holding part 24 to the magnet insertion hole 21, that is, the distance A from the inner circumference of the magnet holding part 24 to the permanent magnet 3. A dimension (thickness) L of each rib 25a in the axial direction is desirably equal to or less than ⅓ of the length B (L≤B/3) of the rotor core 20 in the axial direction.

The two ribs 25a of each connecting part 25 have the same dimension L in the axial direction in this example, but they may have different dimensions L in the axial direction. When the dimensions L of the two ribs 25a in the axial direction are different from each other, they both are desirably equal to or less than ⅓ of the length B of the rotor core 20 in the axial direction.

The connecting part 25 includes two ribs 25a in this example, but the connecting part 25 may include three or more ribs 25a. Even when the connecting part 25 includes three or more ribs 25a the dimension W1 of each rib 25a of the connecting part 25 in the circumferential direction is desirably equal to or less than ½ of the distance A. Further, the dimension L of each rib 25a of the connecting part 25 in the axial direction is desirably equal to or less than ⅓ of the length B of the rotor core 20.

Figure 5A:
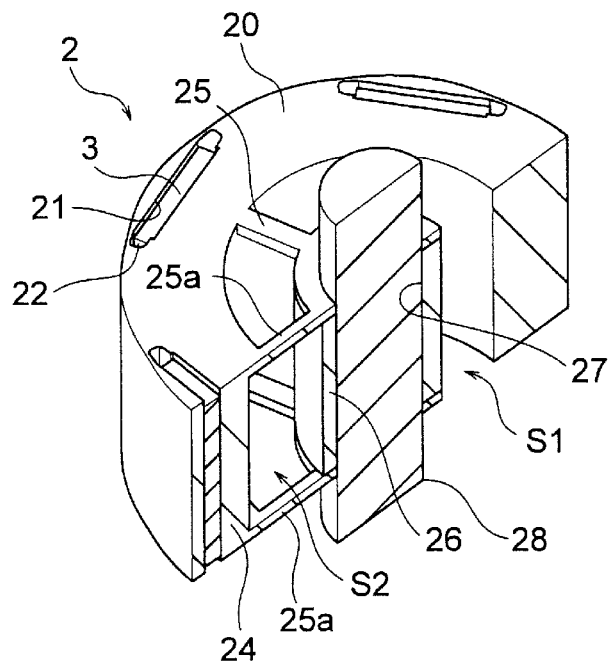
FIG. 5(A) is a partially sectional perspective view illustrating the rotor of the motor in the first embodiment.

FIG. 5(A) is a partially sectional perspective view illustrating the rotor 2 cut along a plane including the axis C1. An opening part S1 is formed between the magnet holding part 24 and the shaft fixing part 26. The magnet holding part 24 and the shaft fixing part 26 are connected to each other via the connecting parts 25, and the opening part S2 is formed between the two ribs 25a of each connecting part 25.

Figure 5B:
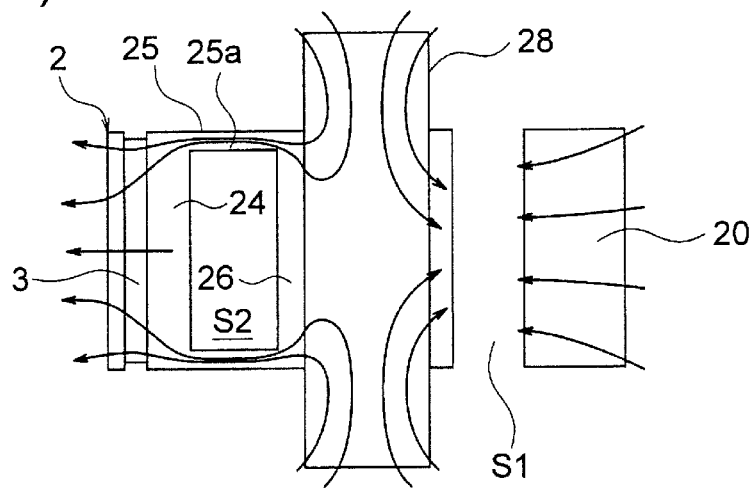
FIG. 5(B) is a schematic view illustrating flow of magnetic flux.

FIG. 5(B) is a schematic view illustrating flow of magnetic flux in the rotor 2. As described above, the magnet magnetic poles 20a of the magnet holding part 24 have the permanent magnets 3, but the pseudo-magnetic poles 20b have no permanent magnets 3. Therefore, flow of magnetic flux from the pseudo-magnetic poles 20b toward the rotation shaft 28 on an inner side in the radial direction occurs.

In the first embodiment, the magnet holding part 24 and the shaft fixing part 26 are distanced from each other via the opening part S1, and the connecting parts 25 connecting the magnet holding part 24 and the shaft fixing part 26 to each other include the opening parts S2. Thus, paths of magnetic flux (magnetic paths) between the magnet holding part 24 and the shaft fixing part 26 are formed only in the ribs 25a of the connecting parts 25. Therefore, magnetic saturation occurs in the ribs 25a due to the magnetic flux flowing through the ribs 25a and flow of magnetic flux between the magnet holding part 24 and the shaft fixing part 26 is restricted. As a result, the magnetic flux leakage to the rotation shaft 28 is suppressed.

In the first embodiment, a cross-sectional area of each rib 25a of the connecting part 25 is set small so that the magnetic flux density in the rib 25a is 1.5 T or higher, and more desirably 2.0 T or higher. A general electromagnetic steel sheet forming a part of the rotor core 20 reaches magnetic saturation and the magnetic permeability decreases when the magnetic flux density reaches 1.5 T (or 2.0 T) or higher. Therefore, the magnetic flux density in each rib 25a is set to 1.5 T or higher (more desirably, 2.0 T or higher) to thereby generate magnetic saturation in the rib 25a. This enhances effect of suppressing the leakage magnetic flux flowing to the rotation shaft 28.

Figure 6A:
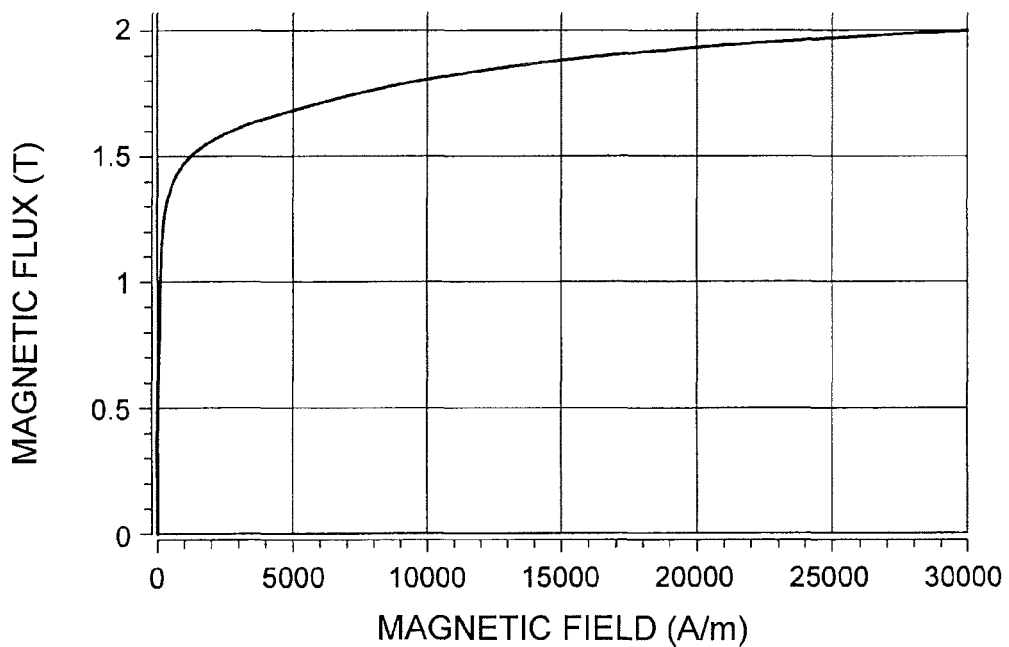
FIG. 6(A) is a first graph illustrating magnetic characteristics of an electromagnetic steel sheet forming a part of a rotor core.
Figure 6B:
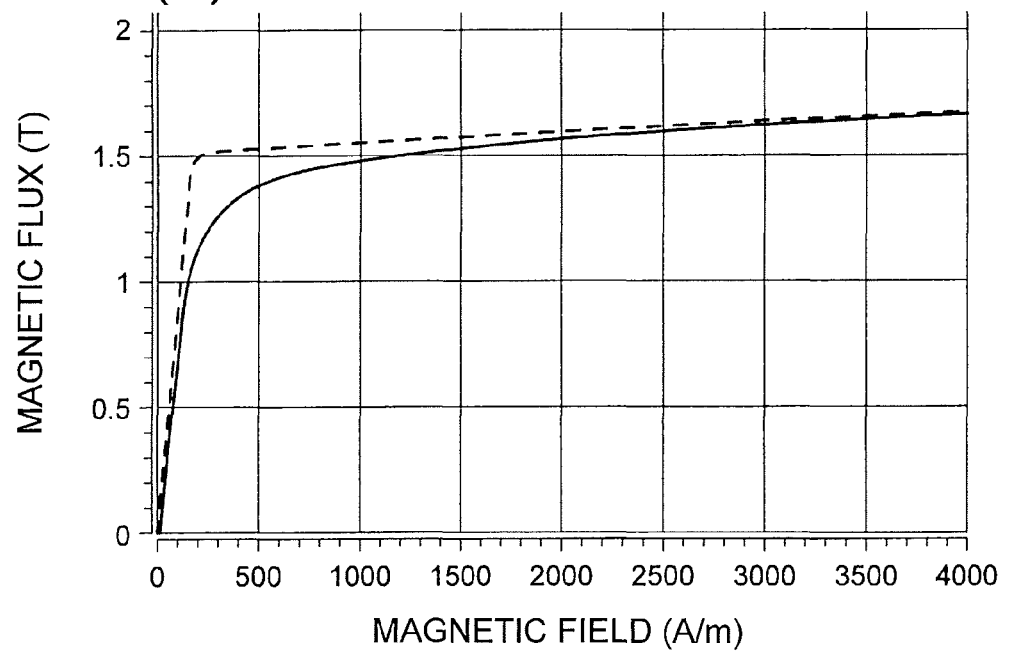
FIG. 6(B) is a second graph illustrating a part of the first graph in an enlarged view.

FIG. 6(A) is a graph illustrating a relationship between the magnetic field and the magnetic flux density in the electromagnetic steel sheet forming a part of the rotor core 20. FIG. 6(B) is an enlarged graph illustrating a range of the magnetic field from 0 to 4,000 A/m in FIG. 6(A). In each graph, a horizontal axis represents the magnetic field (A/m), and a vertical axis represents the magnetic flux density (T). In each of FIGS. 6(A) and 6(B), a steep gradient portion of the curve indicates that magnetic flux is more likely to flow, and a gentle gradient portion of the curve indicates that magnetic flux is less likely to flow.

From FIGS. 6(A) and 6(B), it is understood that a change in magnetic flux density levels off with respect to a change in magnetic field (that is, magnetic saturation occurs) when the magnetic flux density is 1.5 T or higher. From FIG. 6(A), magnetic saturation certainly occurs when the magnetic flux density is 2.0 T or higher.

Figure 7:
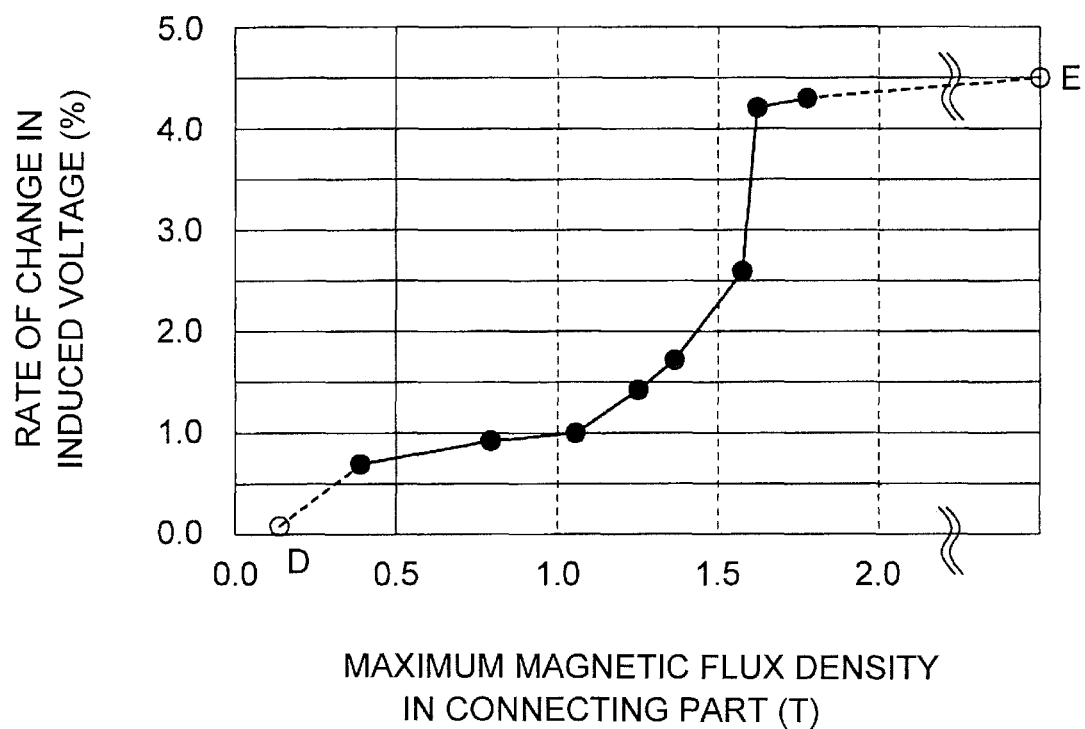
FIG. 7 is a graph illustrating a relationship between a maximum magnetic flux density and a rate of change in induced voltage at a connecting part in the first embodiment.

FIG. 7 is a graph illustrating a relationship between the maximum magnetic flux density in each rib 25a of the connecting part 25 (referred to as a "maximum magnetic flux density in the connecting part" hereinafter) and a rate of change in induced voltage. A horizontal axis represents the maximum magnetic flux density in the connecting part (T), and a vertical axis represents a rate of change in induced voltage (%).

Figure 14A:
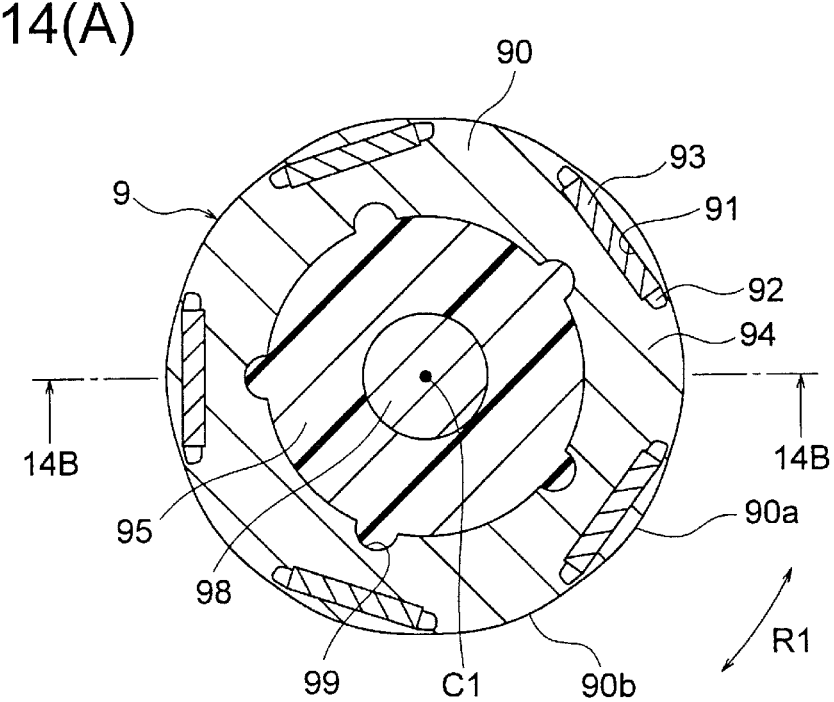
FIG. 14(A) and FIG. 14(B) are a cross-sectional view and a longitudinal sectional view illustrating a rotor in a second comparative example.
Figure 14B:
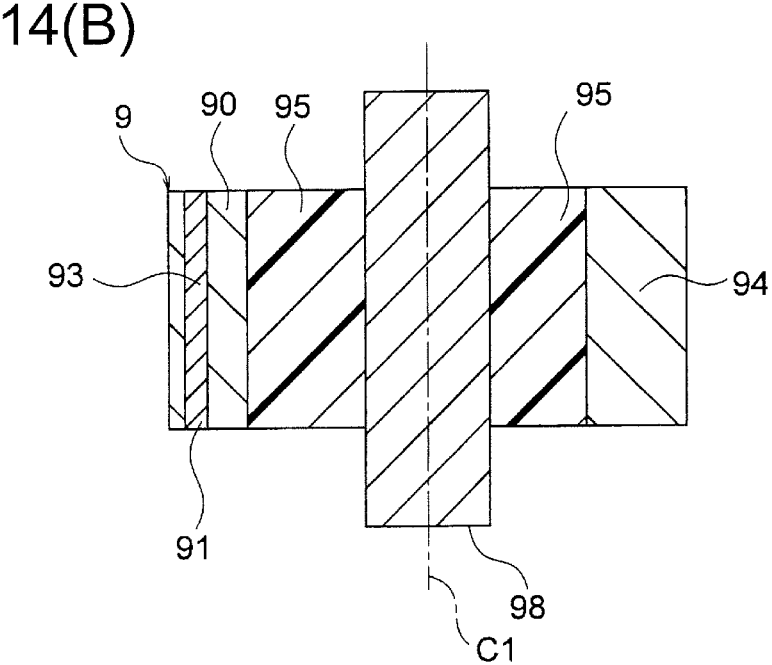

In FIG. 7, reference symbol D denotes data on the consequent-pole motor having the integrated rotor core (a rotor core which is not separated into a magnet holding part and a shaft fixing part) illustrated in FIG. 2(A). In contrast, by separating the rotor core 20 into the magnet holding part 24 and the shaft fixing part 26 and reducing the width of the connecting part 25 connecting these parts, the maximum magnetic flux density in the connecting part 25 increases. Reference symbol E denotes data on a motor including no connecting part between a magnet holding part 94 and a rotation shaft 98 and a resin part 95 is provided instead, as illustrated in FIGS. 14(A) and 14(B) as described later.

The induced voltage is a voltage generated by interlinking of the magnetic flux of the permanent magnets 3 with the coils 15 of the stator 1 when the rotor 2 rotates. As the induced voltage increases, output of the motor 100 increases. The rate of change in induced voltage illustrated in FIG. 7 is the rate of change (%) with respect to the induced voltage (reference value) of the data denoted by reference symbol D.

As the width of the connecting part 25 decreases, the width of the magnetic path decreases, and thus the maximum magnetic flux density increases. The induced voltage sharply increases when the maximum magnetic flux density is in a range of 1.5 T or higher. The induced voltage levels off and stays high when the maximum magnetic flux density is in a range of 2.0 T or higher. From this, it is understood that, by setting the magnetic flux density in each rib 25a of the connecting part 25 to 1.5 T or higher (more desirably, 2.0 T or higher), a high induced voltage can be obtained, and thus high motor output can be obtained.

(Comparative Explanation)

For the purpose of comparison with function of the rotor in the first embodiment, the rotor of the general motor described with reference to FIG. 1(B), the rotor of the consequent-pole motor described with reference to FIG. 2(B), and rotors of motors in comparative examples will be individually described hereinafter.

Figure 8A:
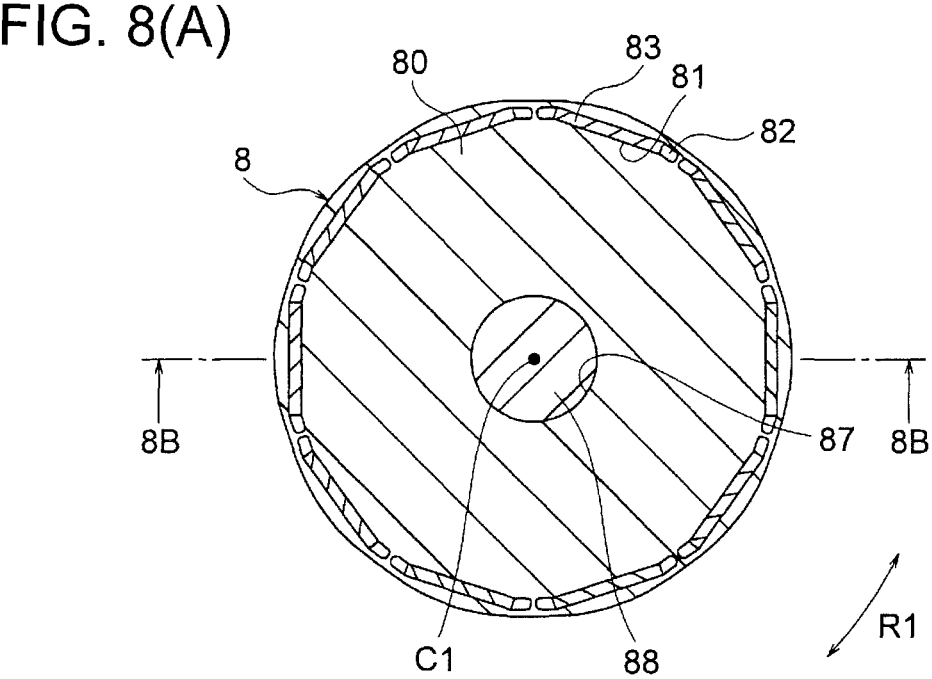
FIG. 8(A) and FIG. 8(B) are a cross-sectional view and a longitudinal sectional view illustrating a general rotor.
Figure 8B:
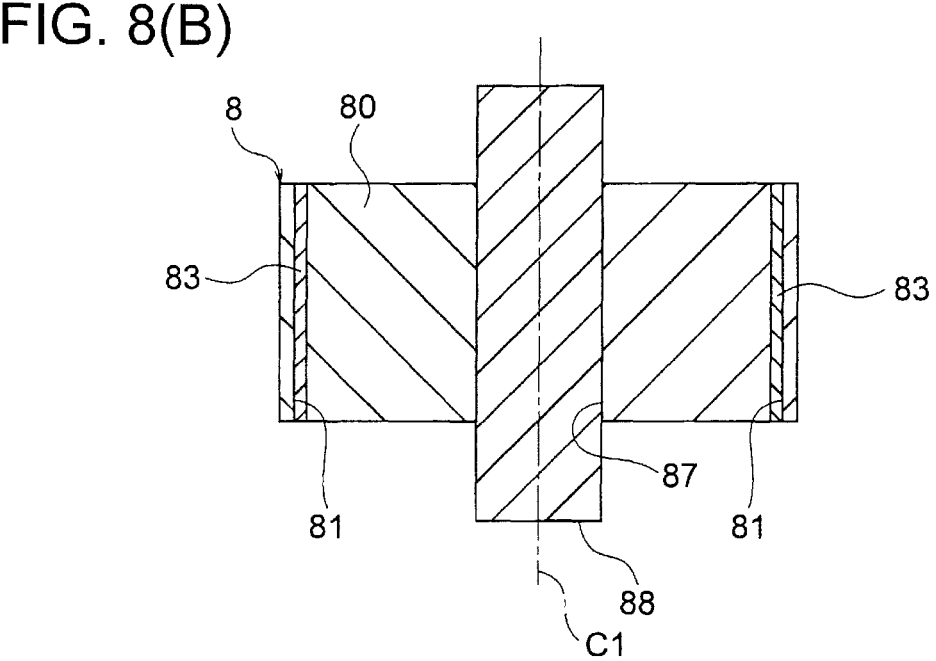
Figure 9A:
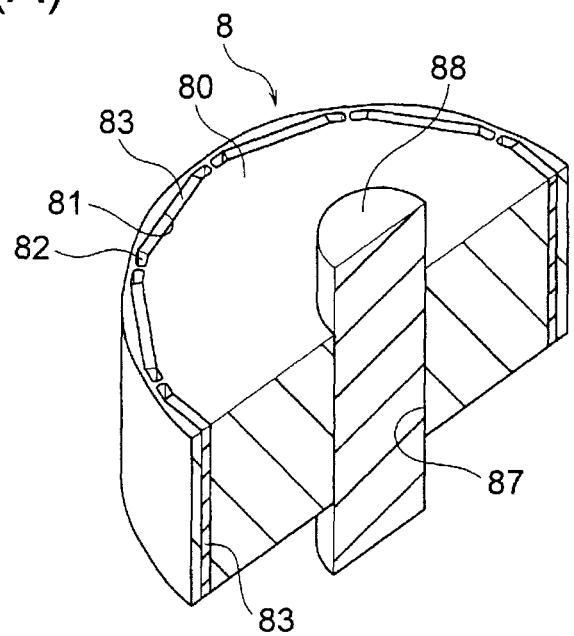
FIG. 9(A) is a partially sectional perspective view illustrating the rotor in FIGS. 8(A) and 8(B)

FIG. 8(A) is a cross-sectional view illustrating the rotor 8 of the general motor described with reference to FIG. 1(B). FIG. 8(B) is a sectional view (longitudinal sectional view) taken along a line 8B-8B illustrated in FIG. 8(A) as seen in a direction indicated by arrows. FIG. 9(A) is a partially sectional perspective view illustrating the rotor 8 cut along a plane including the axis C1. As illustrated in FIGS. 8(A), 8(B), and 9(A), the rotor core 80 of the rotor 8 includes neither the opening part S1 nor the connecting parts 25 (ribs 25a) which are provided in the first embodiment.

Figure 9B:
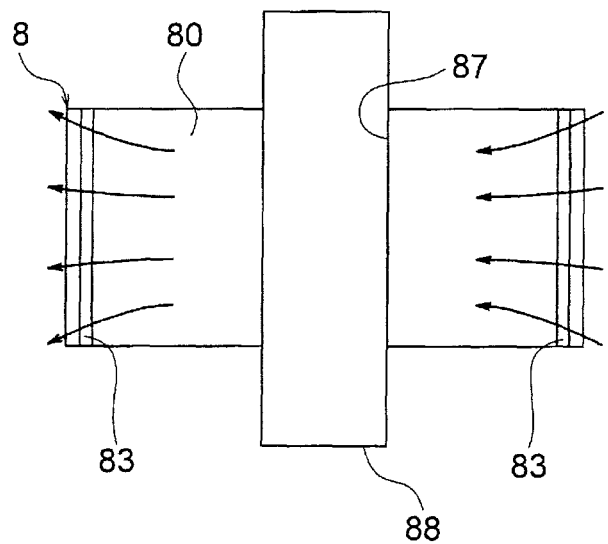
FIG. 9(B) is a schematic view illustrating flow of magnetic flux.

FIG. 9(B) is a schematic view illustrating flow of magnetic flux in the rotor 8. In the rotor 8, since all the magnetic poles are formed by the permanent magnets 83, magnetic flux emanating from the permanent magnets 83 returns to the permanent magnets 83. Thus, magnetic flux leakage to the rotation shaft 88 is less likely to occur.

As above, in the non-consequent-pole general motor, magnetic flux leakage to the rotation shaft 88 is less likely to occur. However, since the number of permanent magnet 83 is large, material cost and machining cost are high as described above.

Figure 10A:
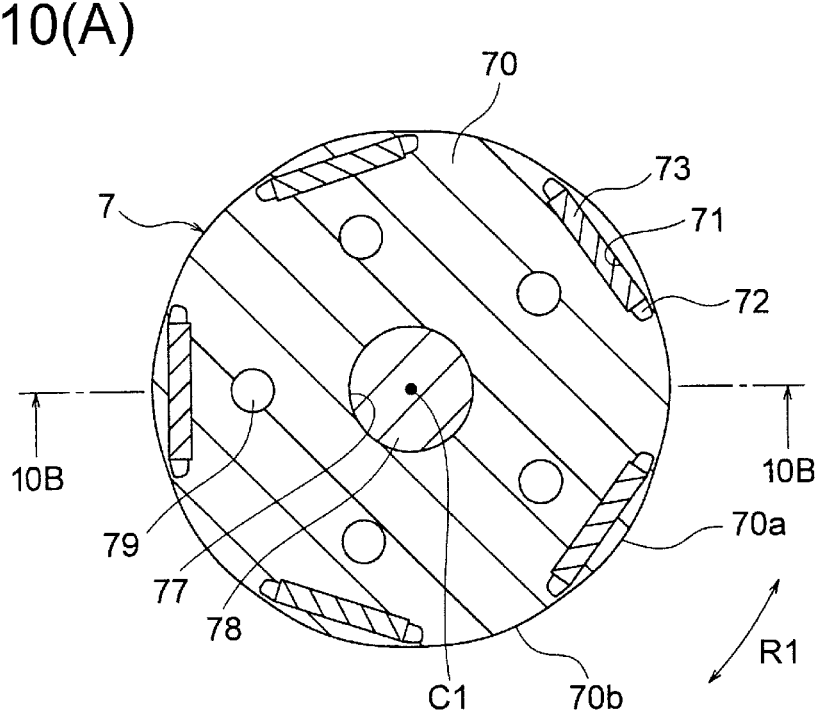
FIG. 10(A) and FIG. 10(B) are a cross-sectional view and a longitudinal sectional view illustrating the consequent-pole rotor.
Figure 10B:
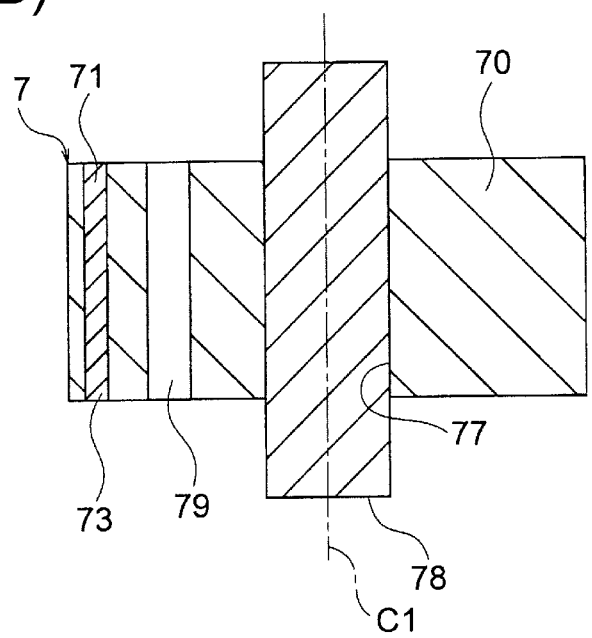
Figure 11A:
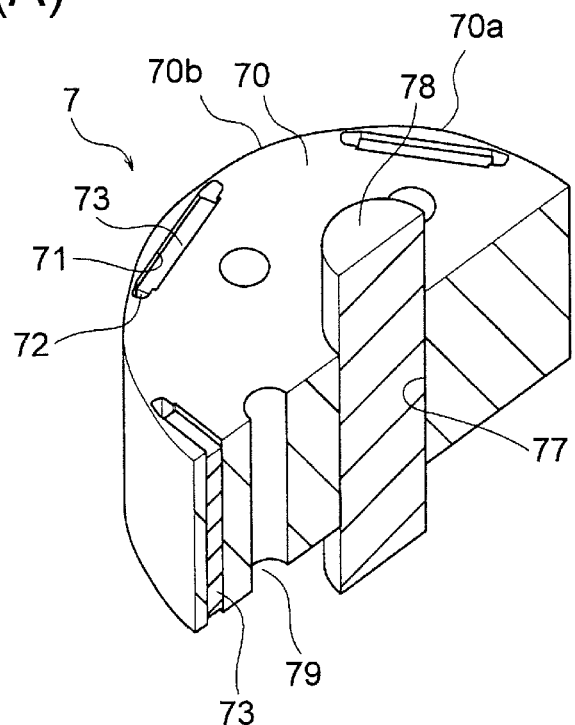
FIG. 11(A) is a partially sectional perspective view illustrating the rotor in FIGS. 10(A) and 10(B)

FIG. 10(A) is a cross-sectional view illustrating the rotor 7 of the consequent-pole motor described with reference to FIG. 2(B). FIG. 10(B) is a sectional view (longitudinal sectional view) taken along a line 10B-10B illustrated in FIG. 10(A) as seen in a direction indicated by arrows. FIG. 11(A) is a partially sectional perspective view illustrating the rotor 7 cut along a plane including the axis C1. As illustrated in FIGS. 10(A), 10(B), and 11(A), the rotor 7 includes magnet magnetic poles 70a formed by the permanent magnets 73, and pseudo-magnetic poles 70b formed by the rotor core 70. However, the rotor core 70 of the rotor 7 includes neither the opening part S1 nor the connecting parts 25 (ribs 25a) which are provided in the first embodiment.

Figure 11B:
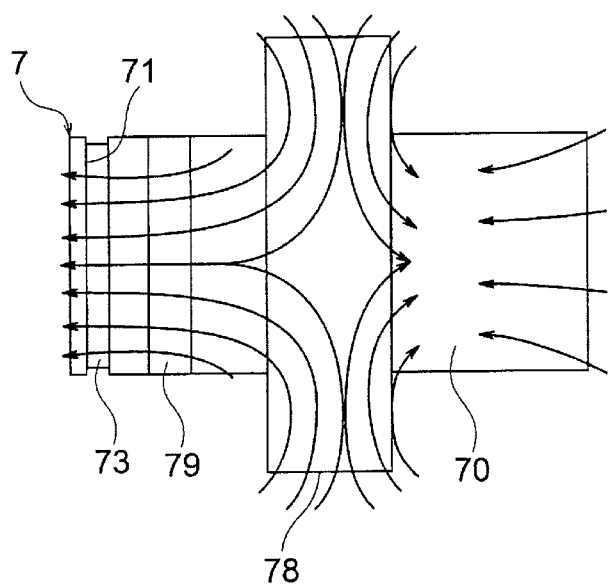
FIG. 11(B) is a schematic view illustrating flow of magnetic flux.

FIG. 11(B) is a schematic view illustrating flow of magnetic flux in the rotor 7. Since the rotor 7 includes the magnet magnetic poles 70a and the pseudo-magnetic poles 70b, and the pseudo-magnetic poles 70b has no permanent magnet 73, magnetic flux is more likely to flow between the rotor core 70 and the rotation shaft 78.

As above, in the consequent-pole motor, although the number of permanent magnets 73 can be reduced, magnetic flux leakage to the rotation shaft 78 is more likely to occur.

Figure 12A:
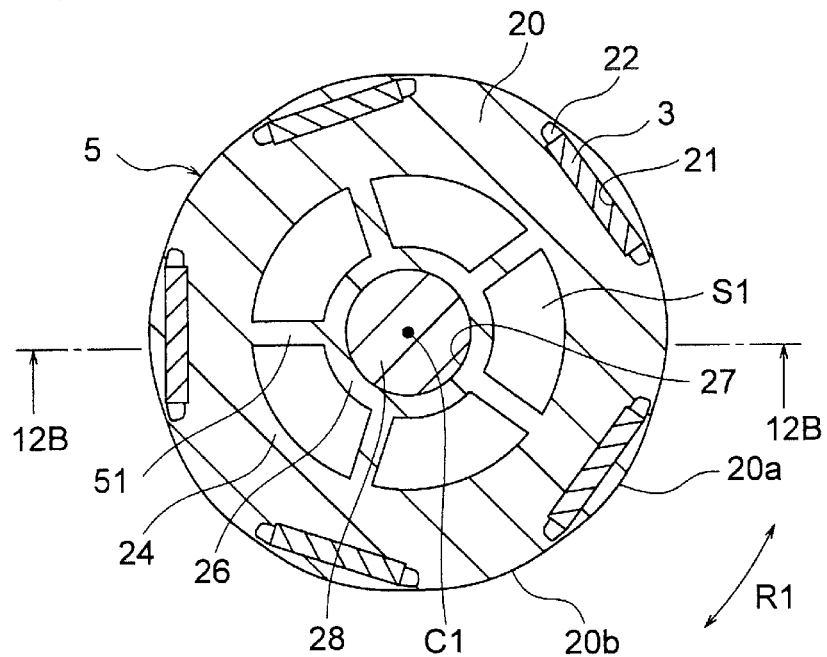
FIG. 12(A) and FIG. 12(B) are a cross-sectional view and a longitudinal sectional view illustrating a rotor for a motor according to a first comparative example.
Figure 12B:
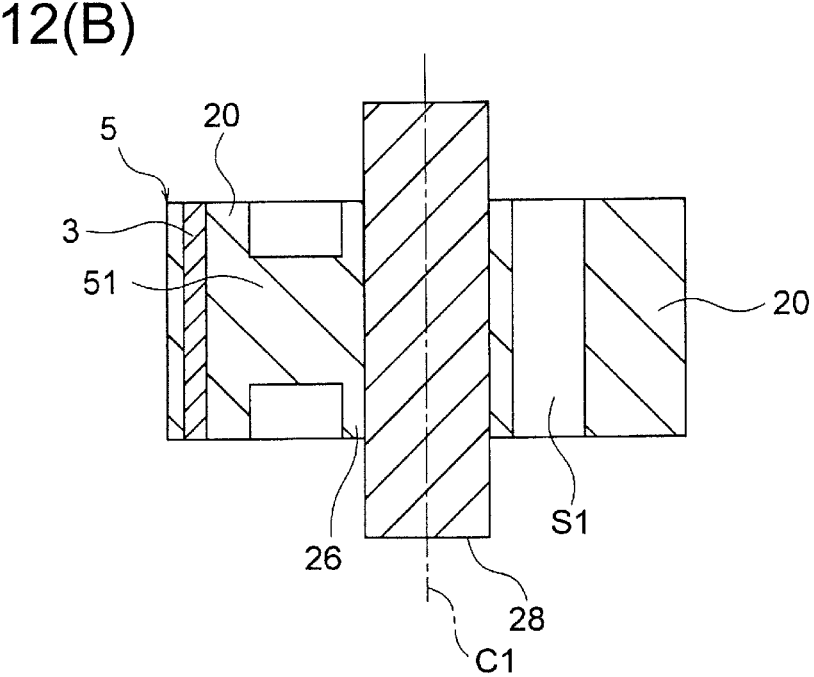
Figure 13A:
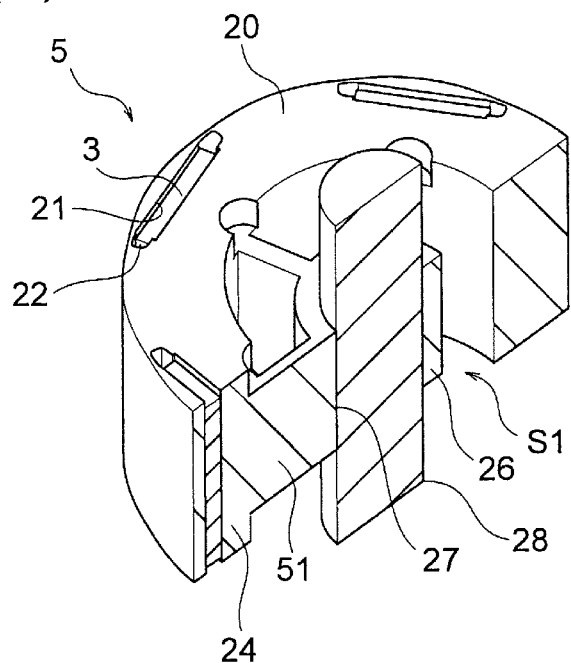
FIG. 13(A) is a partially sectional perspective view illustrating the rotor of the motor in the first comparative example.

FIG. 12(A) is a cross-sectional view illustrating a rotor 5 in a first comparative example. FIG. 12(B) is a sectional view (longitudinal sectional view) taken along a line 12B-12B illustrated in FIG. 12(A) as seen in a direction indicated by arrows. FIG. 13(A) is a partially sectional perspective view illustrating the rotor 5 cut along a plane including the axis C1. As illustrated in FIG. 12(A), the rotor 5 in the first comparative example includes a magnet holding part 24 and a shaft fixing part 26 which are similar to those in the first embodiment. However, the rotor 5 includes plate-like parts 51 connecting the magnet holding part 24 and the shaft fixing part 26 to each other instead of the connecting parts 25 (ribs 25a) in the first embodiment. As illustrated in FIGS. 12(B) and 13(A), the plate-like part 51 is disposed at a central region of the magnet holding part 24 in the axial direction, and includes no opening part inside in the axial direction.

Figure 13B:
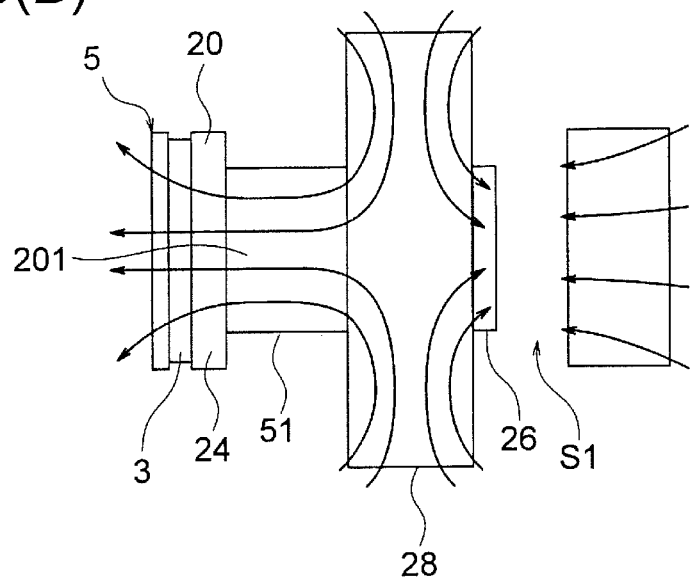
FIG. 13(B) is a schematic view illustrating flow of magnetic flux.

FIG. 13(B) is a schematic view illustrating flow of magnetic flux in the rotor 5. In the rotor 5, since an opening part S1 is formed between the magnet holding part 24 and the shaft fixing part 26, flow of magnetic flux is restricted. However, since the plate-like parts 51 are relatively long in the axial direction, and include no opening parts inside in the axial direction, magnetic flux is more likely to flow between the magnet holding part 24 and the shaft fixing part 26 as compared to the rotor 2 (FIG. 5(B)) in the first embodiment. Thus, magnetic flux leakage to the rotation shaft 28 is more likely to occur.

Figure 15A:
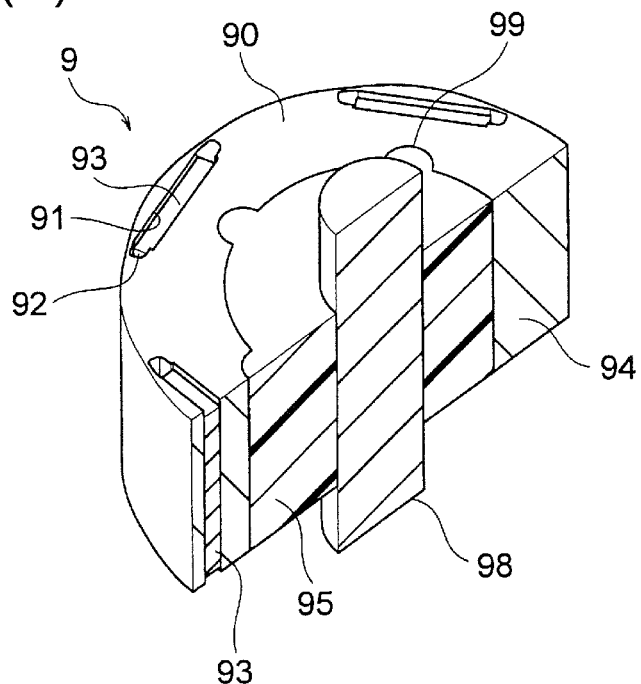
FIG. 15(A) is a partially sectional perspective view illustrating the rotor in FIGS. 14(A) and 14(B)

FIG. 14(A) is a cross-sectional view illustrating a rotor 9 in a second comparative example. FIG. 14(B) is a sectional view (longitudinal sectional view) taken along a line 14B-14B illustrated in FIG. 14(A) as seen in a direction indicated by arrows. FIG. 15(A) is a partially sectional perspective view illustrating the rotor 9 cut along a plane including the axis C1. As illustrated in FIGS. 14(A) and 14(B), the rotor 9 in the second comparative example includes a rotation shaft 98, and an annular rotor core 90 surrounding the rotation shaft 98.

The rotor core 90 includes an annular magnet holding part 94. The magnet holding part 94 includes magnet insertion holes 91 and flux barriers 92, and permanent magnets 93 are disposed in the magnet insertion holes 91. In the rotor 9, magnet magnetic poles 90a formed by the permanent magnets 93, and pseudo-magnetic poles 90b formed by the rotor core 90 are alternately arranged in circumferential direction. Through holes 99 are formed on an inner circumference of the magnet holding part 94. The through holes 99 serve to guide flow of magnetic flux toward the pseudo-magnetic poles 90b, like the through holes 79 illustrated in FIG. 2(B).

The rotor 9 further includes a resin part 95 filling a space between the rotation shaft 98 and the magnet holding part 94, as illustrated in FIGS. 14(B) and 15(A). In other words, in the rotor 9, only the resin part 95 is provided between the rotation shaft 98 and the magnet holding part 94.

Figure 15B:
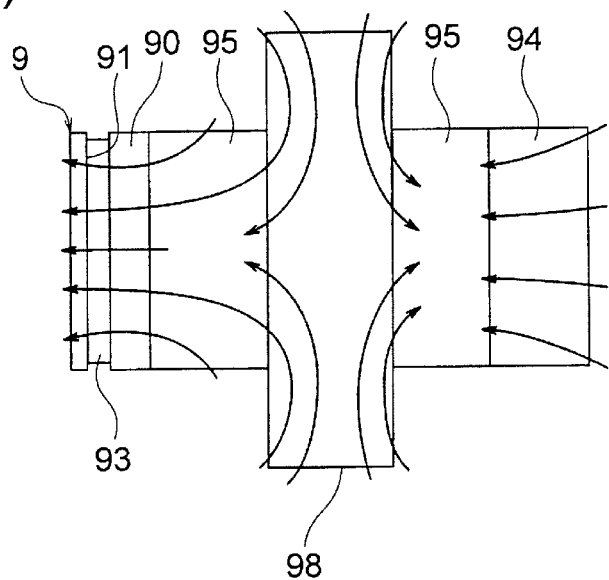
FIG. 15(B) is a schematic view illustrating flow of magnetic flux.

FIG. 15(B) is a schematic view illustrating flow of magnetic flux in the rotor 9. In the rotor 9, since the magnet holding part 94 and the rotation shaft 98 are separated by the resin part 95, flow of magnetic flux between the magnet holding part 94 and the rotation shaft 98 is restricted more greatly than in the consequent-pole motor illustrated in FIG. 11(B).

In the rotor 9, however, since only the resin part 95 connects the magnet holding part 94 and the rotation shaft 98 to each other, it is difficult to improve parallelism between the axial direction of the rotation shaft 98 and the axial direction of the rotor core 90, and coaxiality between the rotation shaft 98 and the rotor core 90.

As above, with respect to comparison targets illustrated in FIGS. 8(A) to 15(B), in the rotor 2 in the first embodiment, the magnet holding part 24 and the shaft fixing part 26 are distanced from each other, and the connecting parts 25 connecting these parts to each other include the opening parts S2. Thus, flow of magnetic flux between the magnet holding part 24 and the shaft fixing part 26 is restricted, and the magnetic flux leakage to the rotation shaft 28 is suppressed.

Since the magnet holding part 24 and the shaft fixing part 26 are connected to each other by the ribs 25a distanced from each other in the axial direction, the parallelism between the axial direction of the rotation shaft 28 and the axial direction of the magnet holding part 24 is improved, and the coaxiality between the rotation shaft 28 and the magnet holding part 24 is improved.

In this example, the two ribs 25a are disposed at both ends of the rotor core 20 in the axial direction, but it is sufficient that the two ribs 25a are distanced from each other in the axial direction. Each connecting part 25 may include three or more ribs 25a in the axial direction.

(Effects of Embodiment)

As described above, the rotor 2 in the first embodiment of the present invention includes the shaft fixing part 26 fixed to the rotation shaft 28, the annular magnet holding part 24 surrounding the shaft fixing part 26 from outside in the radial direction via the opening part S1, and the connecting parts 25 connecting the shaft fixing part 26 and the magnet holding part 24 to each other. The magnet holding part 24 includes the magnet magnetic poles 20a and the pseudo-magnetic poles 20b, and each connecting part 25 includes at least two ribs 25a distanced from each other in the axial direction. With this configuration, the magnetic path between the magnet holding part 24 and the shaft fixing part 26 is restricted, and thus the magnetic flux leakage to the rotation shaft 28 can be suppressed. As a result, the reduction in output of the motor 100 can be suppressed.

Since each connecting part 25 includes at least two ribs 25a distanced from each other in the axial direction and connecting the magnet holding part 24 and the shaft fixing part 26 to each other, the parallelism between the axial direction of the rotation shaft 28 and the axial direction of the magnet holding part 24 can be improved, and the coaxiality between the rotation shaft 28 and the magnet holding part 24 can be improved.

Since the ribs 25a of each connecting part 25 are disposed at both ends of the magnet holding part 24 in the axial direction, the effect of improving the parallelism between the axial direction of the rotation shaft 28 and the axial direction of the magnet holding part 24 and improving the coaxiality between the rotation shaft 28 and the magnet holding part 24 can be enhanced.

Since each connecting part 25 extends from the shaft fixing part 26 toward the central part of the corresponding permanent magnet 3 (magnet magnetic pole 20a) in the circumferential direction, the magnetic flux flowing inward in the radial direction from the pseudo-magnetic poles 20b is less likely to flow into the connecting parts 25. Thus, the effect of suppressing the magnetic flux leakage to the rotation shaft 28 can be enhanced.

Since a plurality of connecting parts 25 radially extend from the shaft fixing part 26 and are arranged at even intervals in the circumferential direction, it is possible to suppress the magnetic flux leakage to the rotation shaft 28, and to suppress displacement of a center of gravity of the rotor 2.

Since the dimension (width) W1 of the connecting part 25 in the circumferential direction is equal to or less than ½ of the distance A (W1≤A/2) from the inner circumference of the magnet holding part 24 to the permanent magnet 3, and the dimension L of each rib 25a in the axial direction is equal to or less than ⅓ of the length B (L≤B/3) of the rotor core 20 in the axial direction, magnetic flux is less likely to flow into the connecting part 25, and thus the effect of suppressing the magnetic flux leakage to the rotation shaft 28 can be further enhanced.

Since the magnetic flux density in the connecting part 25 is 1.5 T or higher (more desirably, 2.0 T or higher), the magnetic flux flowing into the connecting part 25 causes magnetic saturation to occur in the connecting part 25. This makes it possible to further enhance the effect of suppressing the magnetic flux leakage to the rotation shaft 28.

Second Embodiment

Figure 16A:
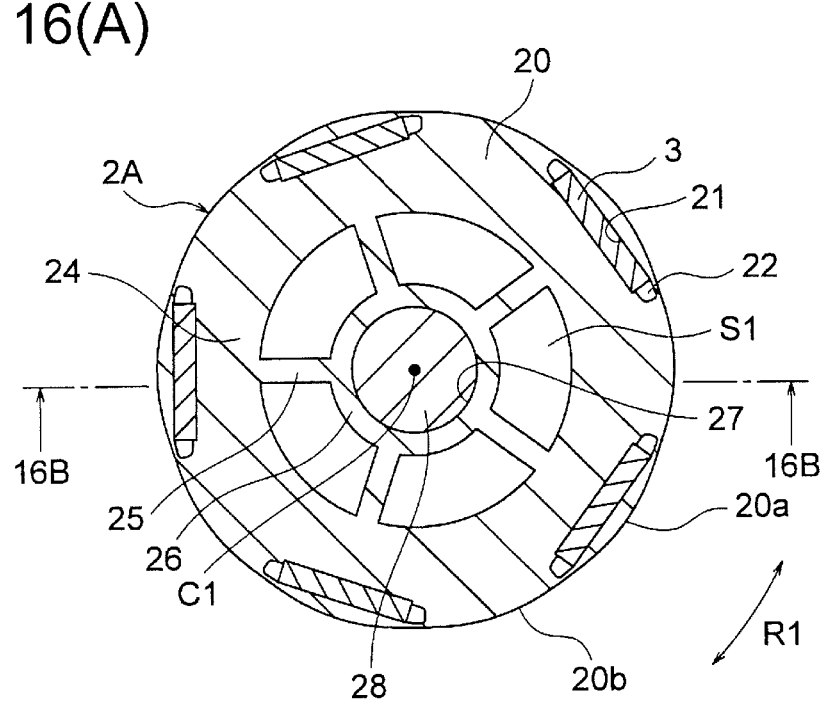
FIG. 16(A) and FIG. 16(B) are a cross-sectional view and a longitudinal sectional view illustrating a rotor of a motor in a second embodiment.
Figure 16B:
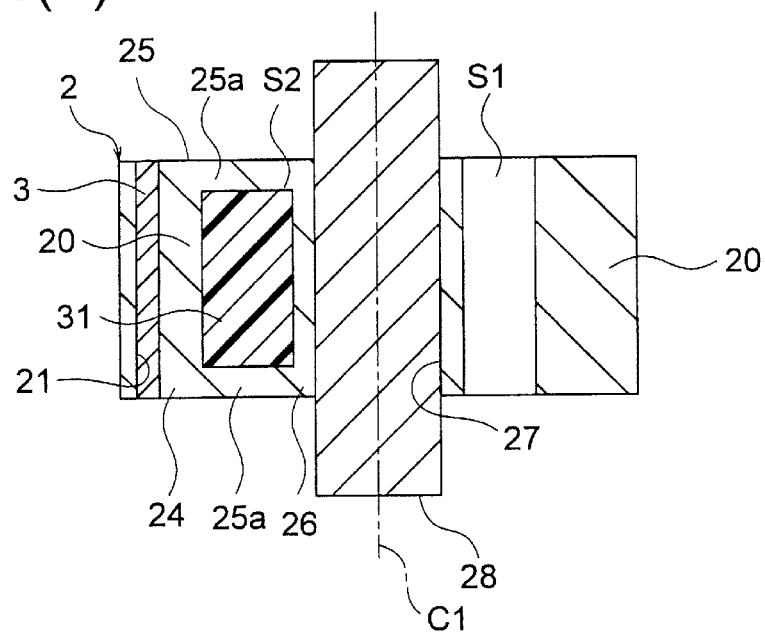
Figure 17:
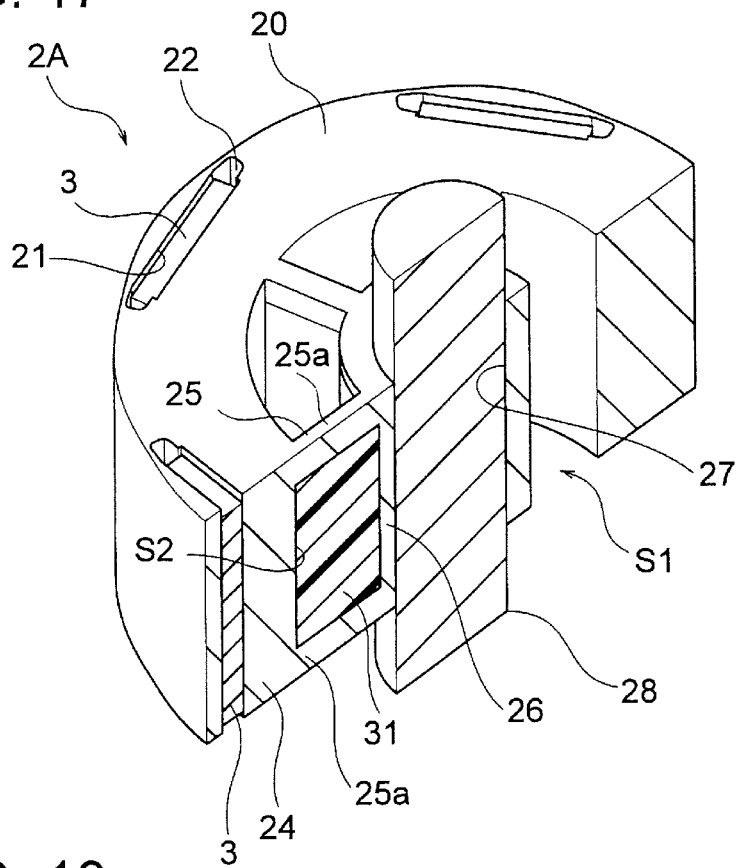
FIG. 17 is a partially sectional perspective view illustrating the rotor of the motor in the second embodiment.

Next, a second embodiment of the present invention will be described. FIG. 16(A) is a cross-sectional view illustrating a rotor 2A of a motor 100 in the second embodiment. FIG. 16(B) is a sectional view (longitudinal sectional view) taken along a line 16B-16B illustrated in FIG. 16(A) as seen in a direction indicated by arrows. FIG. 17 is a partially sectional perspective view illustrating the rotor 2A cut along a plane including the axis C1.

As illustrated in FIG. 16(A), the rotor 2A includes a rotor core 20 and a rotation shaft 28. The rotor core 20 includes a magnet holding part 24, a shaft fixing part 26, and connecting parts 25 connecting these parts to each other, as in the first embodiment. The connecting parts 25 radially extend from the shaft fixing part 26.

In the second embodiment, each connecting part 25 includes two ribs 25a disposed at both ends in the axial direction, and a resin part (first resin part) 31 disposed in an opening part S2 between the two ribs 25a as illustrated in FIGS. 16(B) and 17. The resin part 31 is formed of, for example, unsaturated polyester resin, but the resin part 31 need only be formed of nonmagnetic resin.

The resin part 31 fills the opening part S2 between the two ribs 25a of each connecting part 25. The resin part 31 has, for example, a rectangular flat plate shape, but the resin part 31 need only have a shape that fills the opening part S2. A dimension (width) of the resin part 31 in the circumferential direction is equal to the dimension of the connecting part 25 in the circumferential direction (that is, the dimension of the rib 25a in the circumferential direction) in this example.

By providing the resin parts 31 in the opening parts S2 of the connecting parts 25 as above, strength of the rotor 2A can be enhanced.

An eigenvalue (vibrational eigenvalue) and moment of inertia of the rotor 2A can be adjusted by changing the dimension (width) of the resin part 31 in the circumferential direction. The eigenvalue of the rotor 2A changes depending on rigidity of the rotor 2A, and therefore can be adjusted by changing the width of the resin part 31. By changing the width of the resin part 31 to adjust the eigenvalue as above, resonance can be suppressed and noise characteristics can be adjusted.

As moment of inertia increases, the rotor 2A needs higher starting torque, but rotation of the rotor 2A is stabilized.

Therefore, by changing the width of the resin part 31 to adjust the moment of inertia, the rotation of the rotor 2A can be stabilized.

Figure 18:
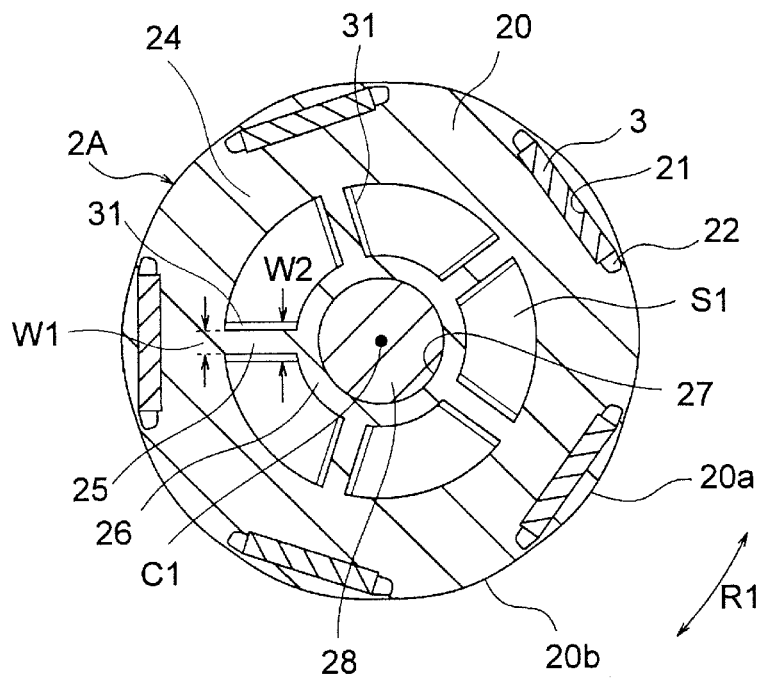
FIG. 18 is a cross-sectional view illustrating another configuration example of the rotor of the motor in the second embodiment.

FIG. 18 is a cross-sectional view illustrating another configuration example of the rotor 2A. In the above described configuration example illustrated in FIGS. 16(A), 16(B), and 17, the dimension (width) of the resin part 31 in the circumferential direction is equal to the dimension of the connecting part 25 in the circumferential direction. In contrast, in the example illustrated in FIG. 18, the dimension (width) W2 of the resin part 31 in the circumferential direction is larger than the dimension W1 of the connecting part 25 in the circumferential direction. With this configuration, strength of the rotor 2A can further be enhanced.

The rotor 2A in the second embodiment is the same as the rotor 2 in the first embodiment, except that the resin parts 31 are provided in the connecting parts 25 of the rotor 2A. The rotor 2A in the second embodiment is combined with the stator 1 (FIG. 3) described in the first embodiment to thereby constitute the motor 100 (FIG. 3).

As described above, since the rotor 2A in the second embodiment includes the resin part 31 in the opening part S2 between the ribs 25a of each connecting part 25, strength of the rotor 2A can be enhanced. Since the resin parts 31 are nonmagnetic, the magnetic flux leakage to the rotation shaft 28 can be suppressed, and the reduction in output of the motor 100 can be suppressed.

The eigenvalue and the moment of inertia of the rotor 2A can be adjusted by adjusting the width of the resin part 31.

Third Embodiment

Figure 19A:
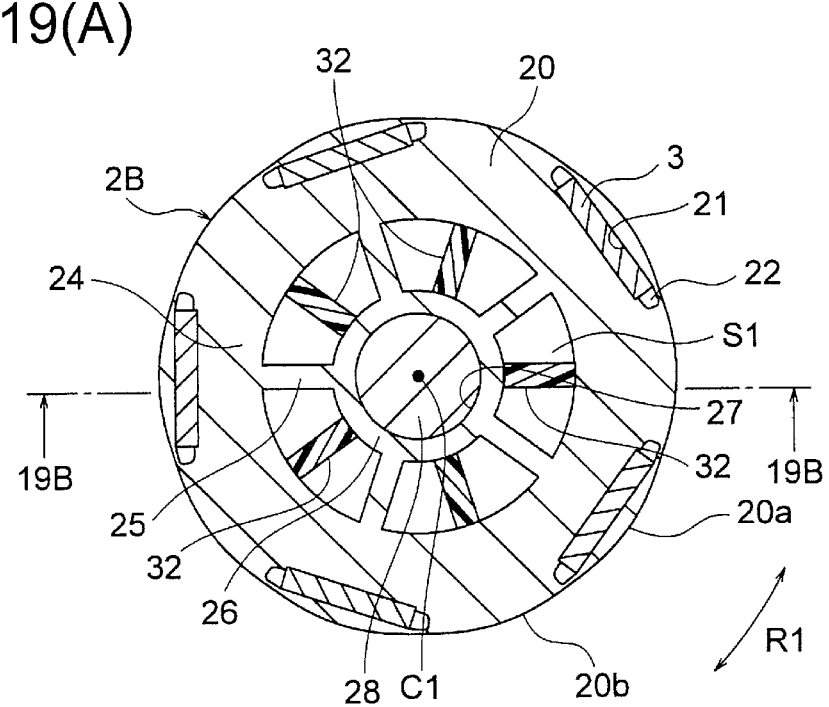
FIG. 19(A) and FIG. 19(B) are a cross-sectional view and a longitudinal sectional view illustrating a rotor of a motor in a third embodiment.
Figure 19B:
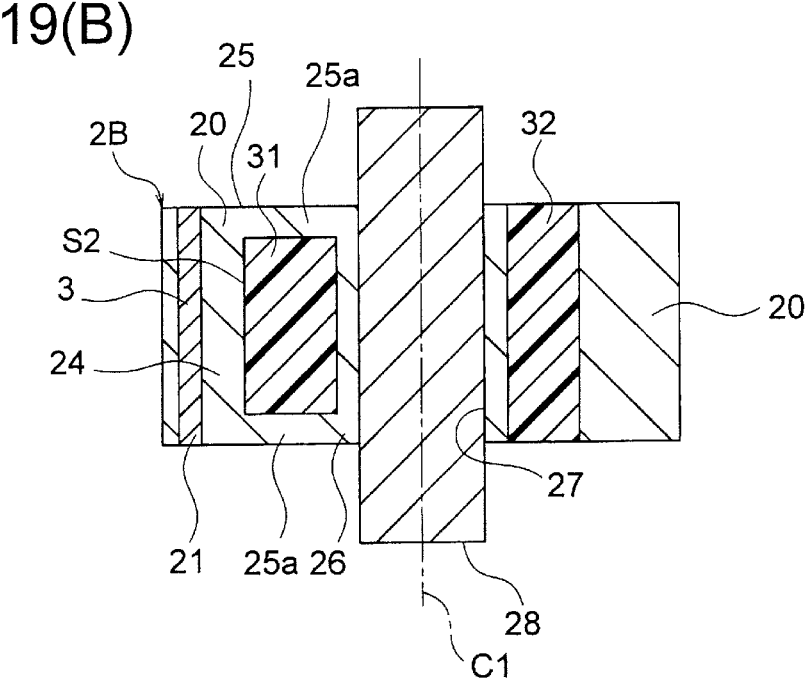
Figure 20:
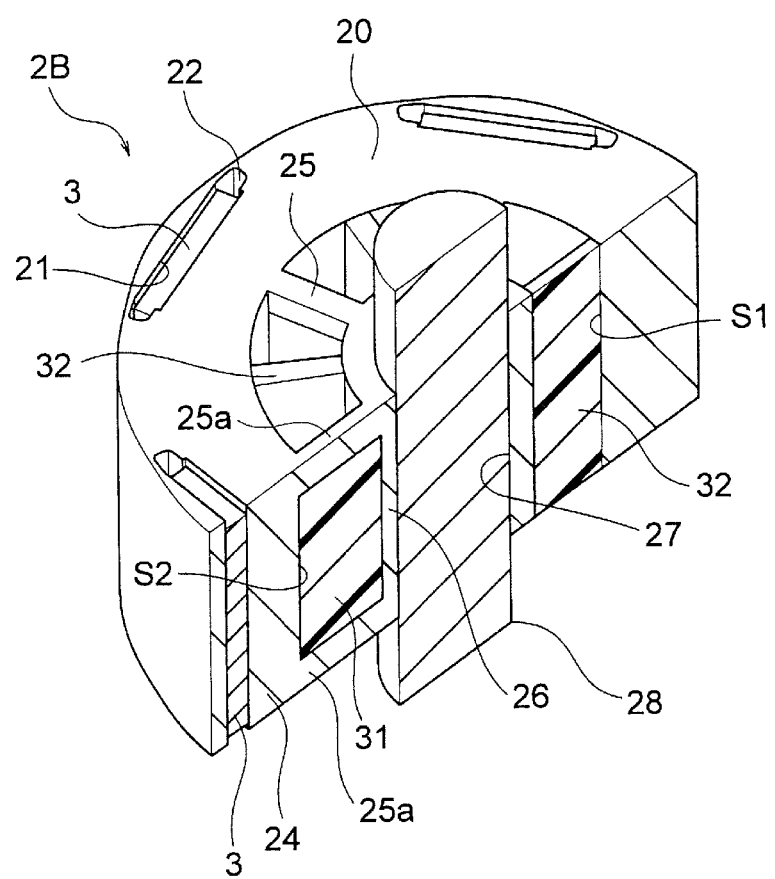
FIG. 20 is a partially sectional perspective view illustrating the rotor of the motor in the third embodiment.

Next, a third embodiment of the present invention will be described. FIG. 19(A) is a cross-sectional view illustrating a rotor 2B of a motor 100 in the third embodiment. FIG. 19(B) is a sectional view (longitudinal sectional view) taken along a line 19B-19B illustrated in FIG. 19(A) as seen in a direction indicated by arrows. FIG. 20 is a partially sectional perspective view illustrating the rotor 2B cut along a plane including the axis C1.

The rotor 2B includes a rotor core 20 and a rotation shaft 28, as illustrated in FIG. 19(A). The rotor core 20 includes a magnet holding part 24, a shaft fixing part 26, and connecting parts 25 connecting these parts to each other, as in the first embodiment. The connecting parts 25 radially extend from the shaft fixing part 26. A resin part 31 (nonmagnetic resin) is disposed in an opening part S2 between two ribs 25a of each connecting part 25, as described in the second embodiment.

In the third embodiment, resin parts (second resin parts) 32 are provided in an opening part S1 between the magnet holding part 24 and the shaft fixing part 26, as illustrated in FIGS. 19(A), 19(B), and 20. The resin parts 32 are formed of, for example, unsaturated polyester resin, but the resin parts 32 need only be formed of nonmagnetic resin.

In this example, a plurality of resin parts 32 radially extend from the shaft fixing part 26 to reach the inner circumference of the magnet holding part 24. The plurality of resin parts 32 are arranged each between the connecting parts 25 adjacent to each other in the circumferential direction, and are arranged evenly in the circumferential direction.

In this example, the connecting parts 25 and the resin parts 32 are alternately arranged in the circumferential direction. However, this embodiment is not limited to such an arrangement. For example, two or more resin parts 32 may be provided between adjacent connecting parts 25. A length of the resin part 32 in the axial direction is equal to the length of the rotor core 20 in the axial direction in this example. However, the length of the resin part 32 in the axial direction may be shorter than the length of the rotor core 20 in the axial direction.

As above, strength of the rotor 2B can be further enhanced by providing the resin parts 32 in the opening part S1 between the magnet holding part 24 and the shaft fixing part 26. Further, displacement of the center of gravity of the rotor 2B can be suppressed by evenly arranging the plurality of resin parts 32 in the circumferential direction. Further, strength of the rotor 2B can still further be enhanced by alternately arranging the connecting parts 25 and the resin parts 32 in the circumferential direction, and setting the length of the resin part 32 in the axial direction equal to the length of the rotor core 20 in the axial direction.

In the third embodiment, the eigenvalue (vibrational eigenvalue) and the moment of inertia of the rotor 2B can be adjusted by changing the number of resin parts 32, the width (the dimension in the circumferential direction) of the resin part 32, or the length of the resin part 32 in the axial direction.

The rotor 2B in the third embodiment is the same as the rotor 2A in the second embodiment, except that the resin parts 32 are provided in the rotor 2B. The rotor 2B in the third embodiment is combined with the stator 1 (FIG. 3) described in the first embodiment to thereby constitute the motor 100 (FIG. 3).

In this example, the rotor core 20 includes both of the resin parts 31 and 32, but the rotor core 20 may include only the resin parts 32. In this regard, the effect of enhancing strength of the rotor 2B is greater when the rotor core 20 includes both of the resin parts 31 and 32.

As described above, since the rotor 2B in the third embodiment includes the resin parts 32 in the opening part S1 between the magnet holding part 24 and the shaft fixing part 26, strength of the rotor 2B can be enhanced. Since the resin parts 32 are nonmagnetic, the magnetic flux leakage to the rotation shaft 28 can be suppressed, and thus reduction in output of the motor 100 can be suppressed.

Since the plurality of resin parts 32 radially extend from the shaft fixing part 26 and are evenly arranged in the circumferential direction, displacement of the center of gravity of the rotor 2B can be suppressed. The eigenvalue and the moment of inertia of the rotor 2B can be adjusted by adjusting the number of resin parts 32, and by adjusting the width, length or the like of the resin part 32.

Fourth Embodiment

Figure 21A:
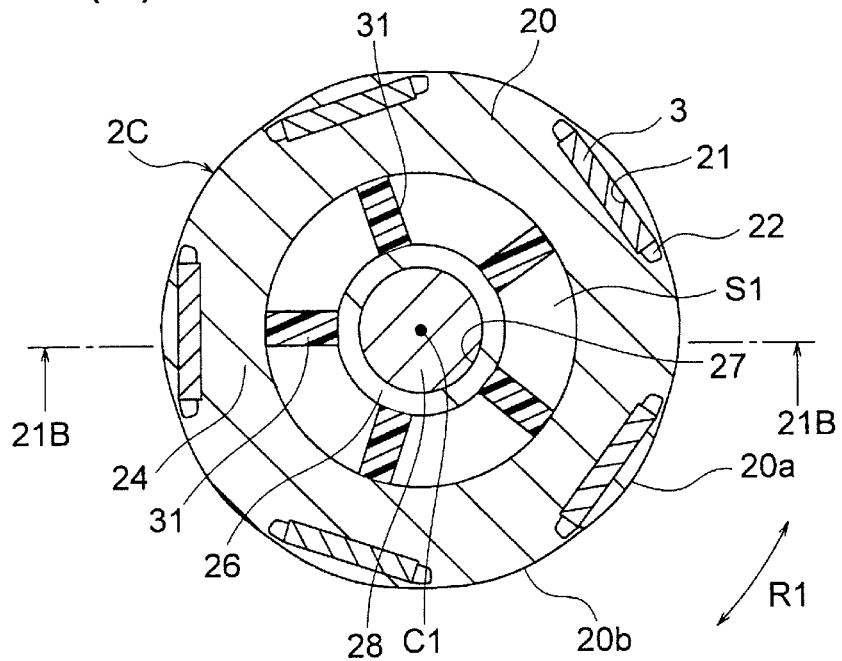
FIG. 21(A) and FIG. 21(B) are a cross-sectional view and a longitudinal sectional view illustrating a rotor of a motor in a fourth embodiment.
Figure 21B:
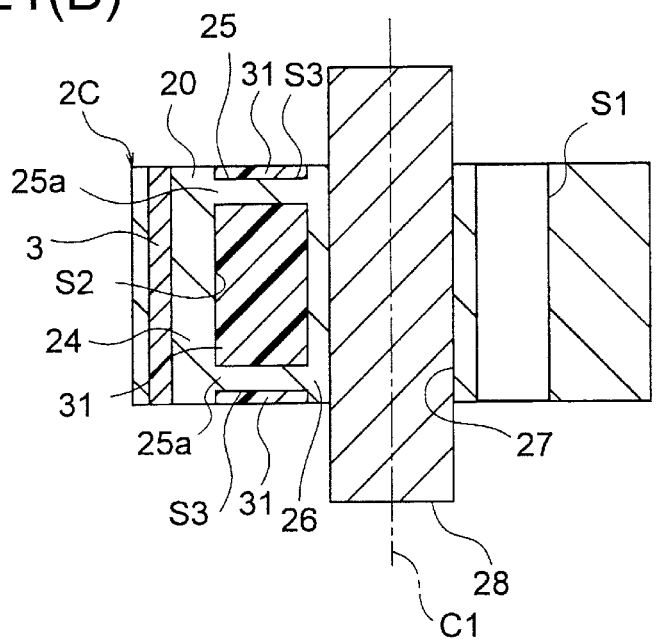
Figure 22:
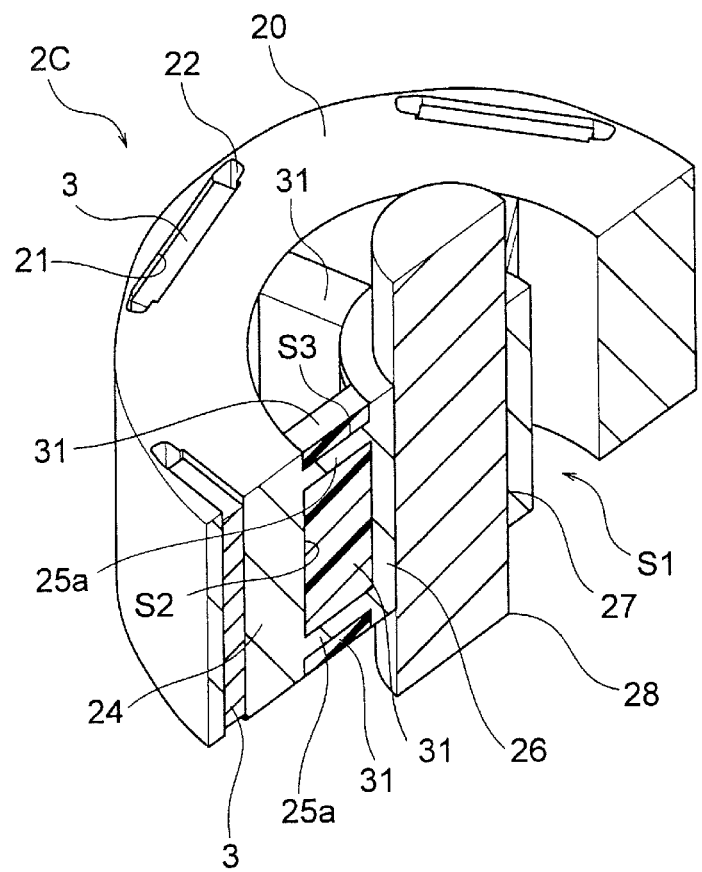
FIG. 22 is a partially sectional perspective view illustrating the rotor of the motor in the fourth embodiment.

Next, a fourth embodiment of the present invention will be described. FIG. 21(A) is a cross-sectional view illustrating a rotor 2C of a motor 100 in the fourth embodiment. FIG. 21(B) is a sectional view (longitudinal sectional view) taken along a line 21B-21B illustrated in FIG. 21(A) as seen in a direction indicated by arrows. FIG. 22 is a partially sectional perspective view illustrating the rotor 2C cut along a plane including the axis C1.

The rotor 2C includes a rotor core 20 and a rotation shaft 28, as illustrated in FIG. 21(A). The rotor core 20 includes a magnet holding part 24, a shaft fixing part 26, and connecting parts 25 connecting these parts to each other, as in the first embodiment. The connecting parts 25 radially extend from the shaft fixing part 26. A resin part 31 (nonmagnetic resin) is provided in an opening part S2 between two ribs 25a of each connecting part 25, as described in the second embodiment.

In the fourth embodiment, the two ribs 25a of each connecting part 25 are formed at positions shifted inward in the axial direction from both ends of the rotor core 20 in the axial direction. In other words, stepped parts S3 (FIG. 21(B)) are respectively formed at both ends of each connecting part 25 in the axial direction (that is, on outer sides of the two ribs 25a in the axial direction).

In the fourth embodiment, the resin parts 31 are formed to further fill the stepped parts S3 at both ends of each connecting part 25 in the axial direction. More specifically, the resin parts 31 are formed to surround the each rib 25a of the connecting part 25 from both sides in the circumferential direction and from both sides in the axial direction. The resin parts 31 are formed of, for example, unsaturated polyester resin, but the resin parts 31 need only be formed of nonmagnetic resin.

With this configuration, the resin parts 31 and the rotor core 20 are tightly connected to each other. Since the resin parts 31 are located at both ends of the rotor core 20 in the axial direction, the effect of improving the parallelism between the axial direction of the rotation shaft 28 and the axial direction of the magnet holding part 24 and improving the coaxiality between the rotation shaft 28 and the magnet holding part 24 can be enhanced.

The rotor 2C in the fourth embodiment is the same as the rotor 2A in the second embodiment, except for arrangement of the ribs 25a and the resin parts 31. The rotor 2C in the fourth embodiment is combined with the stator 1 (FIG. 3) described in the first embodiment to thereby constitute the motor 100 (FIG. 3).

In the rotor 2C in the fourth embodiment, the resin parts 32 (FIG. 19(A)) described in the third embodiment may be added to the opening part S1 between the magnet holding part 24 and the shaft fixing part 26.

As described above, in the rotor 2C in the fourth embodiment, since each connecting part 25 includes the resin parts 31 formed to surround the ribs 25a the resin parts 31 and the rotor core 20 can be tightly connected to each other, and thus strength of the rotor 2C can be further enhanced. Since the resin parts 31 are nonmagnetic, the magnetic flux leakage to the rotation shaft 28 can be suppressed, and the reduction in output of the motor 100 can be suppressed.

Since the resin parts 31 are disposed at both ends of the rotor core 20 in the axial direction, the effect of improving the parallelism between the axial direction of the rotation shaft 28 and the axial direction of the magnet holding part 24 and improving the coaxiality between the magnet holding part 24 and the rotation shaft 28 can be enhanced.

Fifth Embodiment

Figure 23A:
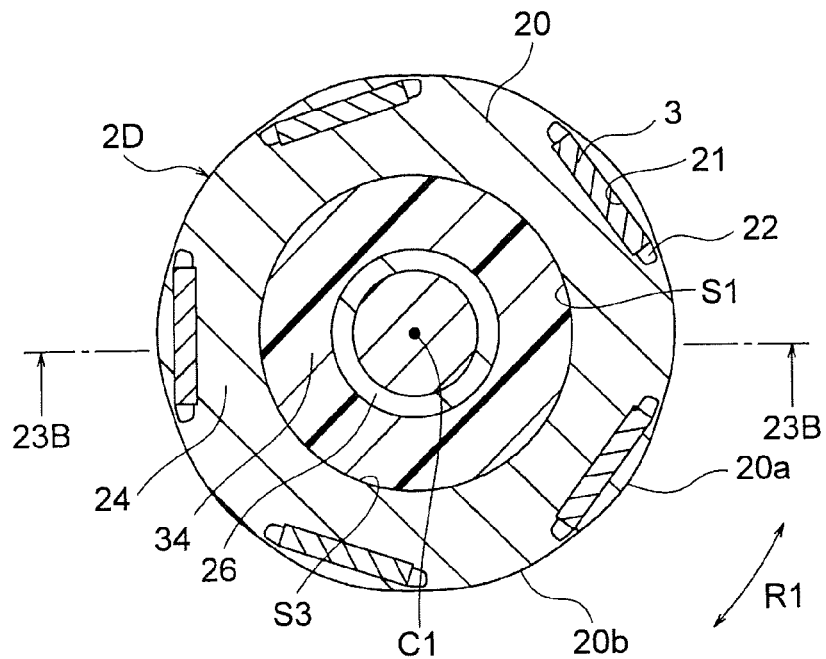
FIG. 23(A) and FIG. 23(B) are a cross-sectional view and a longitudinal sectional view illustrating a rotor of a motor in the fifth embodiment.
Figure 23B:
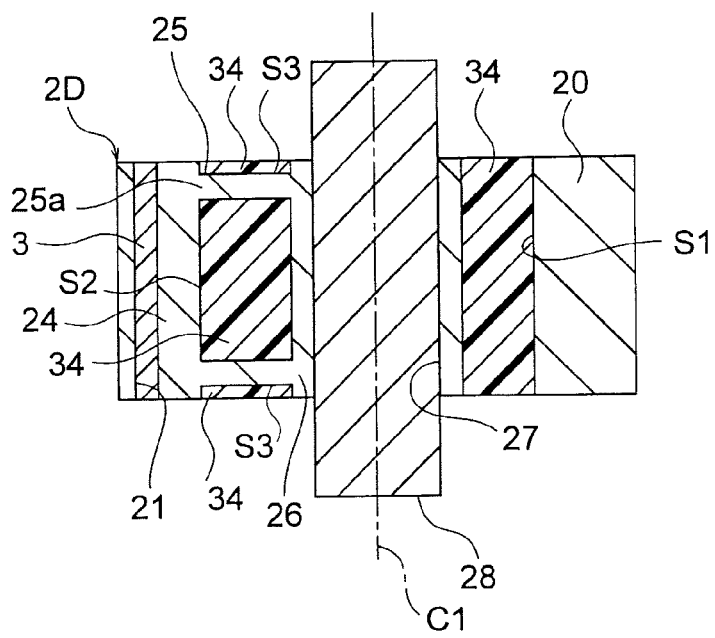
Figure 24:
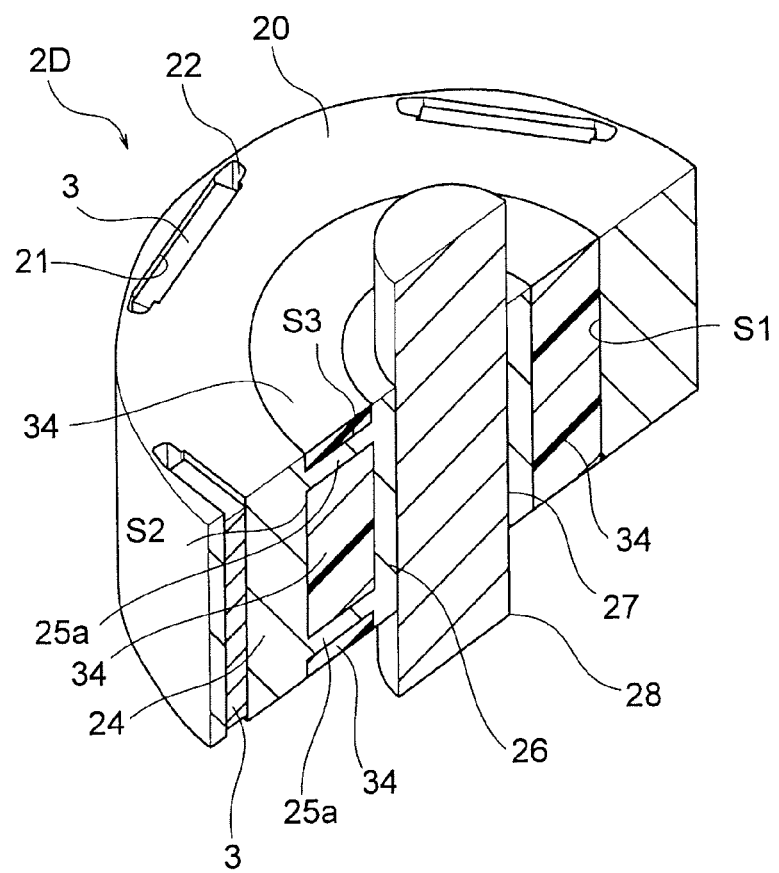
FIG. 24 is a partially sectional perspective view illustrating the rotor of the motor in the fifth embodiment.

Next, a fifth embodiment of the present invention will be described. FIG. 23(A) is a cross-sectional view illustrating a rotor 2D for a motor 100 in the fifth embodiment. FIG. 23(B) is a sectional view (longitudinal sectional view) taken along a line 23B-23B illustrated in FIG. 23(A) as seen in a direction indicated by arrows. FIG. 24 is a partially sectional perspective view illustrating the rotor 2D cut along a plane including the axis C1.

The rotor 2D includes a rotor core 20 and a rotation shaft 28, as illustrated in FIG. 23(A). The rotor core 20 includes a magnet holding part 24, a shaft fixing part 26, and connecting parts 25 connecting these parts to each other, as in the first embodiment. The connecting parts 25 radially extend from the shaft fixing part 26. Stepped parts S3 are formed at both ends of each connecting part 25 in the axial direction, as described in the fourth embodiment.

In the fifth embodiment, a resin part (third resin part) 34 is formed to fill an opening part S1 between the magnet holding part 24 and the shaft fixing part 26. The resin part 34 is formed to further fill an opening part S2 between two ribs 25a of each connecting part 25, and further fill the stepped parts S3 at both ends of each connecting part 25 in the axial direction.

More specifically, in the fifth embodiment, the resin part 34 is integrally formed to fill the opening parts S1 and S2 and the stepped parts S3 which are provided between the magnet holding part 24 and the shaft fixing part 26. The resin part 34 is formed of, for example, unsaturated polyester resin, but the resin part 34 need only be formed of nonmagnetic resin.

As above, since the resin part 34 is integrally formed to fill the opening parts S1 and S2 and the stepped parts S3 which are provided between the magnet holding part 24 and the shaft fixing part 26, the resin part 34 and the rotor core 20 can further be tightly connected to each other, and thus strength of the rotor 2D can be further enhanced.

The rotor 2D in the fifth embodiment is the same as the rotor 2C in the fourth embodiment, except that the rotor 2D includes the resin part 34 in place of the resin parts 31. The rotor 2D in the fifth embodiment is combined with the stator 1 (FIG. 3) described in the first embodiment to thereby constitute the motor 100 (FIG. 3).

In the rotor 2D in the fifth embodiment, it is also possible to employ a configuration in which the two ribs 25a of each connecting part 25 are disposed at both ends of the rotor core 20 in the axial direction (that is, no stepped part S3 is provided) as in the first to third embodiments.

As described above, in the rotor 2D in the fifth embodiment, since the resin part 34 is integrally formed to fill the opening parts S1 and S2 and the stepped parts S3 which are provided between the magnet holding part 24 and the shaft fixing part 26, the resin part 34 and the rotor core 20 can further be tightly connected to each other, and thus strength of the rotor 2D can further be enhanced. Since the resin part 34 is nonmagnetic, the magnetic flux leakage to the rotation shaft 28 can be suppressed, and the reduction in output of the motor 100 can be suppressed.

Since the resin part 34 surrounds and holds the shaft fixing part 26, the effect of improving the parallelism between the axial direction of the rotation shaft 28 and the axial direction of the magnet holding part 24 and improving the coaxiality between the magnet holding part 24 and the rotation shaft 28 can be enhanced.

The moment of inertia of the rotor 2D is maximized by forming the resin part 34 to fill the opening parts S1 and S2 and the stepped parts S3. As the moment of inertia of the rotor 2D increases, torque required for starting the rotor 2D increases, but rotation of the rotor 2D can be stabilized.

Sixth Embodiment

Figure 25A:
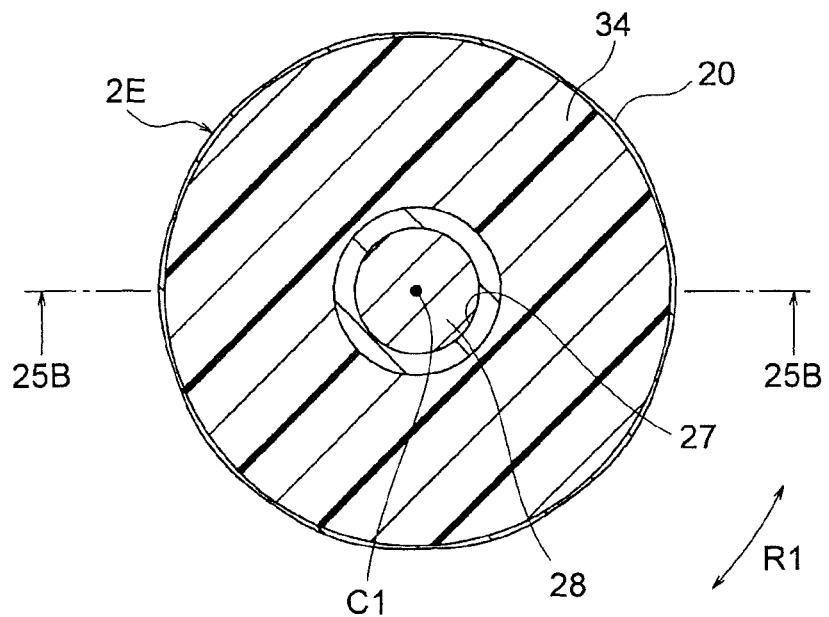
FIG. 25(A) and FIG. 25(B) are a cross-sectional view and a longitudinal sectional view illustrating a rotor of a motor in a sixth embodiment.
Figure 25B:
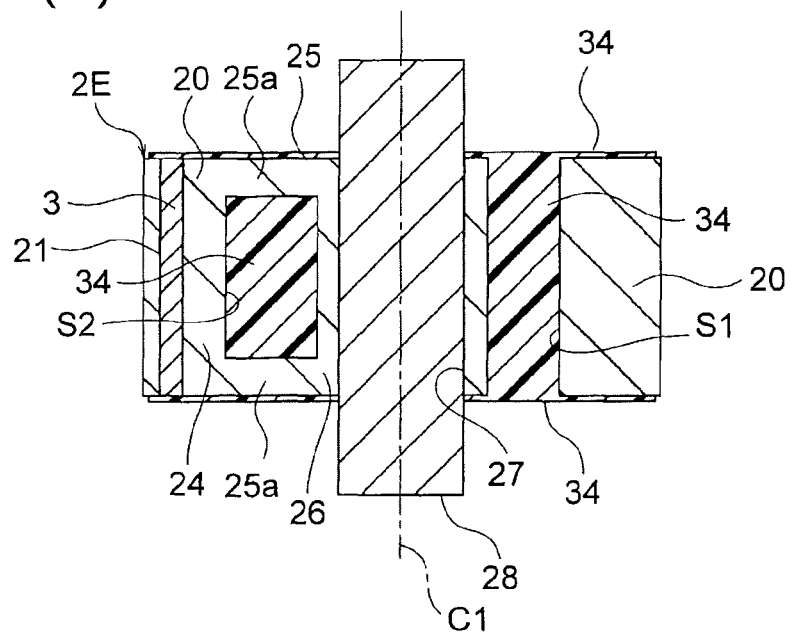
Figure 26:
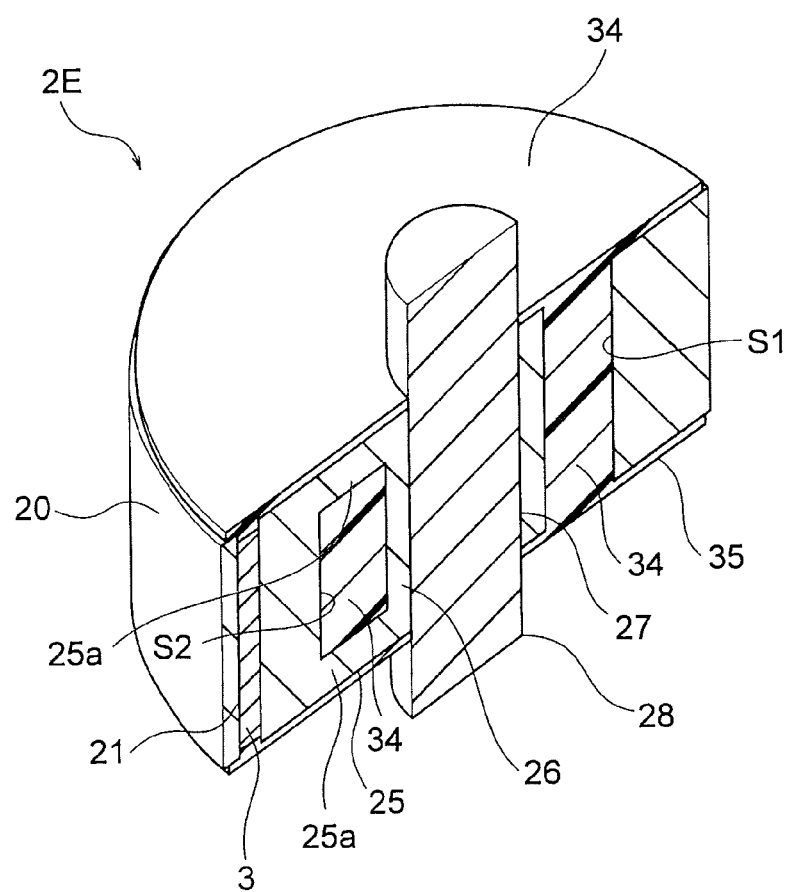
FIG. 26 is a partially sectional perspective view illustrating the rotor of the motor in the sixth embodiment.

Next, a sixth embodiment of the present invention will be described. FIG. 25(A) is a cross-sectional view illustrating a rotor 2E of a motor 100 in the sixth embodiment. FIG. 25(B) is a sectional view (longitudinal sectional view) taken along a line 25B-25B illustrated in FIG. 25(A) as seen in a direction indicated by arrows. FIG. 26 is a partially sectional perspective view illustrating the rotor 2E cut along a plane including the axis C1.

The rotor 2E includes a rotor core 20 and a rotation shaft 28, as illustrated in FIGS. 25(A) and 25(B). The rotor core 20 includes a magnet holding part 24, a shaft fixing part 26, and connecting parts 25 connecting these parts to each other, as in the first embodiment. The connecting parts 25 radially extend from the shaft fixing part 26. A resin part 34 is formed to fill an opening part S1 between the magnet holding part 24 and the shaft fixing part 26, as in the fifth embodiment. The resin part 34 is formed to further fill an opening part S2 between two ribs 25a of each connecting part 25.

In the sixth embodiment, the resin part 34 is integrally formed to further cover both end faces of the rotor core 20 in the axial direction. The resin part 34 is formed to enter the magnet insertion holes 21 from either end face of the rotor core 20 in the axial direction. The resin part 34 is formed of, for example, unsaturated polyester resin, but the resin part 34 need only be formed of nonmagnetic resin.

In the sixth embodiment, since the resin part 34 is formed to cover both end faces of the rotor core 20 in the axial direction, strength of the rotor 2E can further be enhanced. In addition, since the resin part 34 is formed to enter the magnet insertion holes 21, effect of inhibiting looseness of the permanent magnets 3 in the magnet insertion holes 21 is obtained. Therefore, during rotation of the rotor 2E, noise due to movement of the permanent magnets 3 in the magnet insertion holes 21 can be suppressed.

The rotor 2E in the sixth embodiment is the same as the rotor 2D in the fifth embodiment, except for arrangement of the resin part 34 and the ribs 25a. The rotor 2E in the sixth embodiment is combined with the stator 1 (FIG. 3) described in the first embodiment to thereby constitute the motor 100 (FIG. 3).

In this example, the resin part 34 covers both end faces of the rotor core 20 in the axial direction, but effect of enhancing strength of the rotor 2E can be obtained to a certain extent by covering at least one end face of the rotor core 20 in the axial direction. In addition, stepped parts S3 (FIG. 21(B)) may be provided at both ends of each connecting part 25 in the axial direction and covered with the resin part 34, as in the fourth and fifth embodiments.

As described above, in the rotor 2E in the sixth embodiment, since the resin part 34 is formed to cover both end faces of the rotor core 20 in the axial direction, strength of the rotor 2E can further be enhanced. Further, since the resin part 34 is formed to enter the magnet insertion holes 21, looseness of the permanent magnets 3 in the magnet insertion holes 21 can be inhibited, and thus noise can be suppressed. Since the resin part 34 is nonmagnetic, the magnetic flux leakage to the rotation shaft 28 can be suppressed, and the reduction in output of the motor 100 can be suppressed.

In above described first to six embodiments, each connecting part 25 includes two ribs 25a but the number of ribs 25a may be three or more. The arrangement of the connecting parts 25 in the circumferential direction can be freely set as long as the magnetic flux leakage to the rotation shaft 28 can be suppressed and strength of the rotor can be ensured. The number of connecting parts 25 may be different from the number of permanent magnets 3.

The motors with 10 poles and 12 slots have been described in the first to sixth embodiments, but the present invention is not limited to the motor with 10 poles and 12 slots. Any combination of the number of poles and the number of slots can be selected in accordance with intended use and performance of the motor. For example, 10 poles and 9 slots, 8 poles and 12 slots, 8 poles and 9 slots, 6 poles and 9 slots, 4 poles and 6 slots, or other combinations may be selected. The three-phase synchronous motors have been described in the first to six embodiments, but the present invention is not limited to the three-phase synchronous motor.

(Rotary Compressor)

Next, a rotary compressor 300 to which the motor 100 in each of the above described first to six embodiments is applicable will be described. FIG. 27 is a longitudinal sectional view illustrating a configuration of the rotary compressor 300. The rotary compressor 300 is used in, for example, an air conditioning apparatus, and includes a closed container 307, a compression element 301 disposed in the closed container 307, and the motor 100 for driving the compression element 301.

The compression element 301 includes a cylinder 302 having a cylinder chamber 303, the rotation shaft 28 rotated by the motor 100, a rolling piston 304 fixed to the rotation shaft 28, a vane (not illustrated) separating the cylinder chamber 303 into a suction side and a compression side, and an upper frame 305 and a lower frame 306 through which the rotation shaft 28 is inserted. The upper frame 305 and the lower frame 306 close end faces of the cylinder chamber 303 in the axial direction. An upper discharge muffler 308 and a lower discharge muffler 309 are mounted on the upper frame 305 and the lower frame 306, respectively.

The closed container 307 is a cylindrical container. Refrigerating oil (not illustrated) for lubricating sliding portions in the compression element 301 is stored at a bottom of the closed container 307. The rotation shaft 28 is rotatably held by the upper frame 305 and the lower frame 306 serving as bearing parts.

The cylinder 302 has the cylinder chamber 303 therein, and the rolling piston 304 rotates eccentrically in the cylinder chamber 303. The rotation shaft 28 includes an eccentric shaft part, and the rolling piston 304 is fitted to the eccentric shaft part.

The closed container 307 includes a cylindrical frame 315. The stator 1 of the motor 100 is fitted inside the frame 315 by a method such as shrink fitting, press fitting, or welding. Electric power is supplied to the coils 15 of the stator 1 from a glass terminal 311 fixed to the closed container 307. The rotation shaft 28 is fixed to the shaft insertion hole 27 formed at the center of the rotor core 20 (FIG. 1) of the rotor 2.

An accumulator 310 for storing refrigerant gas is mounted outside the closed container 307. A suction pipe 313 is fixed to the closed container 307, and the refrigerant gas is supplied from the accumulator 310 to the cylinder 302 via the suction pipe 313. A discharge pipe 312 for discharging the refrigerant outside is provided in an upper part of the closed container 307.

As the refrigerant, R410A, R407C or R22, for example, can be used. In terms of preventing global warming, a low-GWP (Global Warming Potential) refrigerant is desirably used.

The refrigerant gas supplied from the accumulator 310 is supplied into the cylinder chamber 303 of the cylinder 302 through the suction pipe 313. When the motor 100 is driven by current supplied by an inverter and the rotor 2 rotates, the rotation shaft 28 rotates together with the rotor 2. The rolling piston 304 fitted to the rotation shaft 28 eccentrically rotates in the cylinder chamber 303 to compress the refrigerant in the cylinder chamber 303. The refrigerant compressed in the cylinder chamber 303 passes through the discharge mufflers 308 and 309, further passes through holes (not illustrated) formed in the rotor core 20, and ascends in the closed container 307. The refrigerant ascended in the closed container 307 is discharged from the discharge pipe 312 and supplied to a high-pressure side of a refrigeration cycle.

The refrigerant compressed in the cylinder chamber 303 is mixed with the refrigerating oil, but separation between the refrigerant and the refrigerating oil is accelerated when they pass through the holes formed in the rotor core 20, and thus the refrigerating oil is prevented from flowing into the discharge pipe 312.

The motor 100 in each of the above described first to sixth embodiments is capable of suppressing leakage magnetic flux and reducing manufacturing cost. Hence, by applying the motor 100 to the rotary compressor 300, operating efficiency of the rotary compressor 300 can be improved, and manufacturing cost of the rotary compressor 300 can be reduced.

The motor 100 in each of the first to sixth embodiments is not limited to the rotary compressor 300, and may be used in other types of compressors.

(Fan)

Next, a fan 200 to which the motor 100 in each of above described first to sixth embodiments is applicable will be described. FIG. 28 is a longitudinal sectional view illustrating the fan 200 to which the motor 100 in each of the first to sixth embodiments is applicable. The fan 200 is used in, for example, a vacuum cleaner.

The fan 200 includes a cylindrical frame 210 housing the motor 100, and a blower unit 220. The frame 210 is divided into a first frame part 211 and a second frame part 212 in the axial direction, and the motor 100 is housed in the first frame part 211.

One bearing 215 holding the rotation shaft 28 of the motor 100 is mounted in the first frame part 211, and the other bearing 216 holding the rotation shaft 28 is mounted in the second frame part 212. A preload spring 217 for biasing the bearing 215 in the axial direction is mounted in the first frame part 211.

The first frame part 211 and the second frame part 212 include flanges facing each other, and are fastened together by bonding, screwing, or welding at these flanges. The rotation shaft 28 of the motor 100 passes through the second frame part 212 in the axial direction and projects outward.

The blower unit 220 includes a main plate 222 including a through hole 223 through which the rotation shaft 28 passes, an impeller 221 mounted at an end of the rotation shaft 28 passing through the through hole 223 of the main plate 222, and a fan cover 224 covering the impeller 221 from outside.

An air inlet 225 is formed at a center of the fan cover 224. A flow path (airflow path) for air entering through the air inlet 225 is formed between the main plate 222 and the fan cover 224.

When the rotor 2 of the motor 100 rotates, the impeller 221 fixed to the rotation shaft 28 of the rotor 2 rotates. When the impeller 221 rotates, air enters through the air inlet 225, flows toward an outer peripheral side through the airflow path between the main plate 222 and the fan cover 224, and is discharged from an air outlet (not illustrated) provided on the outer peripheral side.

The motor 100 in each of the above described first to sixth embodiments is capable of suppressing leakage magnetic flux and reducing the manufacturing cost. Hence, by applying the motor 100 to the fan 200, operating efficiency of the fan 200 can be enhanced, and manufacturing cost of the fan 200 can be reduced.

The motor described in each of the above described first to sixth embodiments is not limited to the above described compressor and fan, and can be used as a motor in a ventilating fan, a household electrical appliance, a machine tool, or the like.

While desirable embodiments of the present invention have been described in detail above, the present invention is not limited thereto, and various improvements or modifications may be made without departing from the gist of the present invention.

What is claimed is:

1. A rotor of a consequent pole type comprising:
a rotation shaft;
a rotor core having a shaft fixing part having a shaft insertion hole in which the rotation shaft is inserted, an annular magnet holding part surrounding the shaft fixing part from outside in a radial direction about a central axis of the rotation shaft and being distanced from the shaft fixing part, and a connecting part connecting the shaft fixing part and the magnet holding part to each other; and
a permanent magnet mounted in the magnet holding part and forming a first magnetic pole,
wherein a portion of the magnet holding part adjacent to the permanent magnet in a circumferential direction forms a second magnetic pole,
wherein the connecting part has:
two ribs disposed at both ends of the rotor core in a direction of the central axis, and
an opening part extending from one of the two ribs to the other of the two ribs, and
wherein except for both ends of the rotor core in the direction of the central axis, the shaft fixing part and the magnet holding part are apart from each other.

2. The rotor according to claim 1, wherein a dimension of each of the two ribs in the direction of the central axis is equal to or less than ⅓ of a length of the rotor core in the direction of the central axis.

3. The rotor according to claim 1, wherein the connecting part extends from the shaft fixing part toward a central part of the permanent magnet in the circumferential direction.

4. The rotor according to claim 1, wherein a plurality of connecting parts including the connecting part radially extend from the shaft fixing part toward the magnet holding part.

5. The rotor according to claim 1, wherein a dimension of the connecting part in the circumferential direction is equal to or less than ½ of a distance from an inner edge of the magnet holding part in the radial direction to the permanent magnet.

6. The rotor according to claim 1, wherein each of the ribs of the connecting part has a width such that a magnetic flux density in each of the ribs is equal to or higher than 1.5 T.

7. The rotor according to claim 6, wherein each of the ribs of the connecting part has a width such that a magnetic flux density in each of the ribs is equal to or higher than 2.0 T.

8. The rotor according to claim 1, wherein a first resin part is disposed between the two ribs of the connecting part.

9. The rotor according to claim 8, wherein a dimension of the first resin part in the circumferential direction is longer than a dimension of the connecting part in the circumferential direction.

10. The rotor according to claim 8, wherein the first resin part is disposed to surround the two ribs of the connecting part from the circumferential direction and the direction of the central axis.

11. The rotor according to claim 10, wherein the first resin part is further disposed at each end of the connecting part in the direction of the central axis.

12. The rotor according to claim 1, wherein a second resin part is provided between the magnet holding part and the shaft fixing part.

13. The rotor according to claim 12, wherein a plurality of second resin parts including the second resin part radially extend from the shaft fixing part toward the magnet holding part.

14. The rotor according to claim 13, wherein the plurality of second resin parts and the plurality of connecting parts are alternately arranged in the circumferential direction.

15. The rotor according to claim 1, wherein a third resin part is formed to fill a space between the magnet holding part and the shaft fixing part.

16. The rotor according to claim 15, wherein the third resin part covers at least one end face of the rotor core in the direction of the central axis.

17. The rotor according to claim 16, wherein the magnet holding part has a magnet insertion hole in which the permanent magnet is inserted, and
wherein the third resin part is further disposed in the magnet insertion hole.

18. A motor comprising a rotor, and a stator provided to surround the rotor,
the rotor of a consequent pole type comprising:
a rotation shaft;
a rotor core having a shaft fixing part having a shaft insertion hole in which the rotation shaft is inserted, an annular magnet holding part surrounding the shaft fixing part from outside in a radial direction about a central axis of the rotation shaft and being distanced from the shaft fixing part, and a connecting part connecting the shaft fixing part and the magnet holding part to each other; and
a permanent magnet mounted in the magnet holding part and forming a first magnetic pole,
wherein a portion of the magnet holding part adjacent to the permanent magnet in a circumferential direction forms a second magnetic pole, and
wherein the connecting part has:
two ribs disposed at both ends of the rotor core in a direction of the central axis, and
an opening part extending from one of the two ribs to the other of the two ribs and
wherein except for both ends of the rotor core in the direction of the central axis, the shaft fixing part and the magnet holding part are apart from each other.

19. A compressor comprising a motor, and a compression element driven by the motor,
the motor comprising:
a rotor of a consequent pole type, and a stator provided to surround the rotor,
the rotor comprising:
a rotation shaft;
a rotor core having a shaft fixing part having a shaft insertion hole in which the rotation shaft is inserted, an annular magnet holding part surrounding the shaft fixing part from outside in a radial direction about a central axis of the rotation shaft and being distanced from the shaft fixing part, and a connecting part connecting the shaft fixing part and the magnet holding part to each other; and
a permanent magnet mounted in the magnet holding part and forming a first magnetic pole,
wherein a portion of the magnet holding part adjacent to the permanent magnet in a circumferential direction forms a second magnetic pole, and
wherein the connecting part has:
two ribs disposed at both ends of the rotor core in a direction of the central axis, and
an opening part extending from one of the two ribs to the other of the two ribs and
wherein except for both ends of the rotor core in the direction of the central axis, the shaft fixing part and the magnet holding part are apart from each other.

20. A fan comprising an impeller, and a motor to rotate the impeller,
the motor comprising:
a rotor of a consequent pole type, and a stator provided to surround the rotor,
the rotor comprising:
a rotation shaft;
a rotor core having a shaft fixing part having a shaft insertion hole in which the rotation shaft is inserted, an annular magnet holding part surrounding the shaft fixing part from outside in a radial direction about a central axis of the rotation shaft and being distanced from the shaft fixing part, and a connecting part connecting the shaft fixing part and the magnet holding part to each other; and
a permanent magnet mounted in the magnet holding part and forming a first magnetic pole,
wherein a portion of the magnet holding part adjacent to the permanent magnet in a circumferential direction forms a second magnetic pole, and
wherein the connecting part has:
two ribs disposed at both ends of the rotor core in a direction of the central axis, and
an opening part extending from one of the two ribs to the other of the two ribs and
wherein except for both ends of the rotor core in the direction of the central axis, the shaft fixing part and the magnet holding part are apart from each other.

* * * * *